United States Patent
Chou et al.

(10) Patent No.: US 7,113,939 B2
(45) Date of Patent: Sep. 26, 2006

(54) ARCHITECTURE TO ENABLE SEARCH GATEWAYS AS PART OF FEDERATED SEARCH

(75) Inventors: Kehsing J. Chou, San Jose, CA (US); Mei-Ing W. Huang, San Jose, CA (US); Taejae Lee, Cupertino, CA (US); Basuki N. Soetarman, Los Gatos, CA (US); Robert Nelson Summers, San Jose, CA (US); Siucheong Kenny Tse, San Jose, CA (US); Alan Tsu-I Yaung, San Jose, CA (US); Mimi Phuong-Thao Vo, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 155 days.

(21) Appl. No.: 09/399,682

(22) Filed: Sep. 21, 1999

(65) Prior Publication Data

US 2002/0174122 A1 Nov. 21, 2002

(51) Int. Cl.
*G06F 7/00* (2006.01)
(52) U.S. Cl. ............. 707/3; 707/4; 707/10; 707/103 R; 707/103 Y; 707/103 X
(58) Field of Classification Search ................ 707/103, 707/10, 3, 4, 103 R, 103 Y, 103 X
See application file for complete search history.

(56) References Cited

U.S. PATENT DOCUMENTS

| 4,853,843 | A | * | 8/1989 | Ecklund ..................... 364/200 |
|---|---|---|---|---|
| 5,761,663 | A | * | 6/1998 | Lagarde et al. ............... 707/10 |
| 5,806,065 | A | * | 9/1998 | Lomet .......................... 707/8 |
| 5,859,972 | A | * | 1/1999 | Subramaniam et al. |
| 5,930,786 | A | * | 7/1999 | Carino, Jr. et al. ............. 707/4 |
| 6,012,067 | A | * | 1/2000 | Sarkar ........................ 707/103 |
| 6,044,373 | A | * | 3/2000 | Gladney et al. .............. 707/10 |
| 6,119,109 | A | * | 9/2000 | Muratani et al. ........... 705/400 |
| 6,185,567 | B1 | * | 2/2001 | Ratnaraj et al. .............. 707/10 |
| 6,263,342 | B1 | * | 7/2001 | Chang et al. ............... 707/103 |
| 6,321,251 | B1 | * | 11/2001 | Deisinger et al. ........... 709/203 |
| 6,374,243 | B1 | * | 4/2002 | Kobayashi et al. ........... 707/10 |
| 6,446,087 | B1 | * | 9/2002 | Lai ............................ 707/201 |

* cited by examiner

*Primary Examiner*—Shahid Alam
*Assistant Examiner*—Hung Pham
(74) *Attorney, Agent, or Firm*—Sughrue Mion, PLLC

(57) ABSTRACT

An architecture to enable search gateways as part of a federated search supports searching for data in one or more heterogeneous data sources. The one or more heterogeneous data sources are within a computer system. Initially, a request for data is received at a federated data source. From the federated data source, data is retrieved from one or more of one or more terminal data repositories or one or more search gateway data sources.

3 Claims, 7 Drawing Sheets

ARCHITECTURE TO ENABLE SEARCH GATEWAYS AS PART OF FEDERATED SEARCH

CROSS-REFERENCE TO RELATED APPLICATIONS

This application is related to the following co-pending and commonly-assigned patent applications:

Application Ser. No. 09/400,532, entitled "MANAGING RESULTS OF FEDERATED SEARCHES ACROSS HETEROGENEOUS DATASTORES WITH A FEDERATED RESULT SET CURSOR OBJECT," filed on same date herewith, by Basuki N. Soertarman et al.;

Application Ser. No. 09/399,696, entitled "THE ARCHITECTURE AND IMPLEMENTATION OF A DYNAMIC RMI SERVER CONFIGURATION HIERARCHY TO SUPPORT FEDERATED SEARCH AND UPDATE ACROSS HETEROGENEOUS DATASTORES," filed on same date herewith, by Kehsing J. Chou et al.;

Application Ser. No. 09/400,638, entitled "THE DESIGN AND IMPLEMENTATION OF A CLIENT/SERVER FRAMEWORK FOR FEDERATED MULTI-SEARCH AND UPDATE ACROSS HETEROGENEOUS DATASTORES," filed on same date herewith, by Kehsing J. Chou et al.,;

Application Ser. No. 09/400,638, entitled "DELAYED DELIVERY OF QUERY RESULTS OR OTHER DATA FROM A FEDERATED SERVER TO A FEDERATED CLIENT UNTIL SUCH INFORMATION IS NEEDED," filed on same date herewith, by M. W. Huang et al.;

Application Ser. No. 09/399,695, entitled "IMPROVED EXTENDED DATA OBJECT ARCHITECTURE FOR HANDLING MULTI-STREAMING AND COMPLEX MULTI-DIMENSIONAL FILES," filed on same date herewith, by Kehsing J. Chou et al.;

Application Ser. No. 08/852,062, entitled "CLASS HIERARCHY FOR OBJECT AGGREGATION REPRESENTATION OF RELATIONAL DATABASE ROWS WITH CELLS HAVING NONTRADITIONAL DATATYPES," filed on May 6, 1997, by Daniel T. Chang et al.;

Application Ser. No. 08/852,055, entitled "FLEXIBLE OBJECT REPRESENTATION OF RELATIONAL DATABASE CELLS HAVING NONTRADITIONAL DATATYPES," filed on May 6, 1997, by Daniel T. Chang et al.;

Application Ser. No. 09/052,678, entitled "MANAGING RESULTS OF FEDERATED SEARCHES ACROSS HETEROGENEOUS DATASTORES WITH A FEDERATED COLLECTION OBJECT," filed on Apr. 1, 1998, by Daniel T. Chang et al.;

Application Ser. No. 09/052,680, entitled "FEDERATED SEARCHING OF HETEROGENEOUS DATASTORES USING A FEDERATED DATASTORE OBJECT," filed on Apr. 1, 1998, by Daniel T. Chang et al.; and Application Ser. No. 09/052,679, entitled "FEDERATED SEARCHING OF HETEROGENEOUS DATASTORES USING A FEDERATED QUERY OBJECT," filed on Apr. 1, 1998, by Daniel T. Chang et al.;

each of which is incorporated by reference herein.

BACKGROUND OF THE INVENTION

1. Field of the Invention

This invention relates in general to database management systems performed by computers, and in particular, to providing an architecture to enable search gateways as part of a federated search.

2. Description of Related Art

The present invention relates to a system and method for representing and searching multiple heterogeneous datastores and managing the results of such searches. Datastore is a term used to refer to a generic data storage facility, such as a relational data base, flat-file, hierarchical data base, etc. Heterogeneous is a term used to indicate that the datastores need not be similar to each other. For example, each datastore may store different types of data, such as image or text, or each datastore may be based on a different theory of data model, such as Digital Library/VisualInfo or Domino Extended Search (DES).

For nearly half a century computers have been used by businesses to manage information such as numbers and text, mainly in the form of coded data. However, business data represents only a small part of the world's information. As storage, communication and information processing technologies advance, and as their costs come down, it becomes more feasible to digitize other various types of data, store large volumes of it, and be able to distribute it on demand to users at their place of business or home.

New digitization technologies have emerged in the last decade to digitize images, audio, and video, giving birth to a new type of digital multimedia information. These multimedia objects are quite different from the business data that computers managed in the past, and often require more advanced information management system infrastructures with new capabilities. Such systems are often called "digital libraries."

Bringing new digital technologies can do much more than just replace physical objects with their electronic representation. It enables instant access to information; supports fast, accurate, and powerful search mechanisms; provides, new "experiential" (i.e. virtual reality) user interfaces; and implements new ways of protecting the rights of information owners. These properties make digital library solutions even more attractive and acceptable not only to corporate IS organizations, but to the information owners, publishers and service providers.

Generally, business data is created by a business process (an airline ticket reservation, a deposit at the bank, and a claim processing at an insurance company are examples). Most of these processes have been automated by computers and produce business data in digital form (text and numbers). Therefore it is usually structured coded data. Multimedia data, on the contrary, cannot be fully pre-structured (its use is not fully predictable) because it is the result of the creation of a human being or the digitization of an object of the real world (x-rays, geophysical mapping, etc.) rather than a computer algorithm.

The average size of business data in digital form is relatively small. A banking record—including a customers name, address, phone number, account number, balance, etc.—represents at most a few hundred characters, i.e. few hundreds/thousands of bits. The digitization of multimedia information (image, audio, video) produces a large set of bits called an "object" or "blobs" (Binary Large Objects). For example, a digitized image of the parchments from the Vatican Library takes as much as the equivalent of 30 million characters (30 MB) to be stored. The digitization of a movie, even after compression, may take as much as the equivalent of several billions of characters (3–4 GB) to be stored.

Multimedia information is typically stored as much larger objects, ever increasing in quantity and therefore requiring special storage mechanisms. Classical business computer systems have not been designed to directly store such large objects. Specialized storage technologies may be required for certain types of information, e.g. media streamers for video or music. Because certain multimedia information needs to be preserved "forever" it also requires special storage management functions providing automated back-up and migration to new storage technologies as they become available and as old technologies become obsolete.

Finally, for performance reasons, the multimedia data is often placed in the proximity of the users with the system supporting multiple distributed object servers. This often requires a logical separation between applications, indices, and data to ensure independence from any changes in the location of the data.

The indexing of business data is often imbedded into the data itself. When the automated business process stores a person's name in the column "NAME," it actually indexes that information. Multimedia information objects usually do not contain indexing information. This "meta data" needs to be created in addition by developers or librarians. The indexing information for multimedia information is often kept in "business like" databases separated from the physical object.

In a Digital Library (DL), the multimedia object can be linked with the associated indexing information, since both are available in digital form. Integration of this legacy catalog information with the digitized object is crucial and is one of the great advantages of DL technology. Different types of objects can be categorized differently as appropriate for each object type. Existing standards like MARC records for libraries, Finding Aids for archiving of special collections, etc . . . can be used when appropriate.

The indexing information used for catalog searches in physical libraries is mostly what one can read on the covers of the books: authors name, title, publisher, ISBN, . . . enriched by other information created by librarians based on the content of the books (abstracts, subjects, keywords, . . . ). In digital libraries, the entire content of books, images, music, films, etc. are available and "new content" technologies are needed; technologies for full text searching, image content searching (searching based on color, texture, shape, etc . . . ), video content searching, and audio content searching. The integrated combination of catalog searches (e.g. SQL) with content searches will provide more powerful search and access functions. These technologies can also be used to partially automate further indexing, classification, and abstracting of objects based on content.

To harness the massive amounts of information spread throughout these networks, it has become necessary for a user to search numerous storage facilities at the same time without having to consider the particular implementation of each storage facility.

Object-oriented approaches are generally better suited for such complex data management. The term "object-oriented" refers to a software design method which uses "classes" and "objects" to model abstract or real objects. An "object" is the main building block of object-oriented programming, and is a programming unit which has both data and functionality (i.e., "methods"). A "class" defines the implementation of a particular kind of object, the variables and methods it uses, and the parent class it belongs to.

Some known programming tools that can be used for developing search and result-management frameworks include IBM VisualAge C++, Microsoft Visual C++, Microsoft Visual J++, and Java.

There is a need in the art for an improved federated system. In particular, there is a need in the art for an architecture to enable search gateways as part of a federated search.

SUMMARY OF THE INVENTION

To overcome the limitations in the prior art described above, and to overcome other limitations that will become apparent upon reading and understanding the present specification, the present invention discloses a method, apparatus, and article of manufacture for an architecture to enable search gateways as part of a federated search.

According to an embodiment of the invention, an architecture to enable search gateways as part of a federated search supports searching for data in one or more heterogeneous data sources. The one or more heterogeneous data sources are within a computer system. Initially, a request for data is received at a federated data source. From the federated data source, data is retrieved from one or more of one or more terminal data repositories or one or more search gateway data sources.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Federated Architecture

Figure 1:
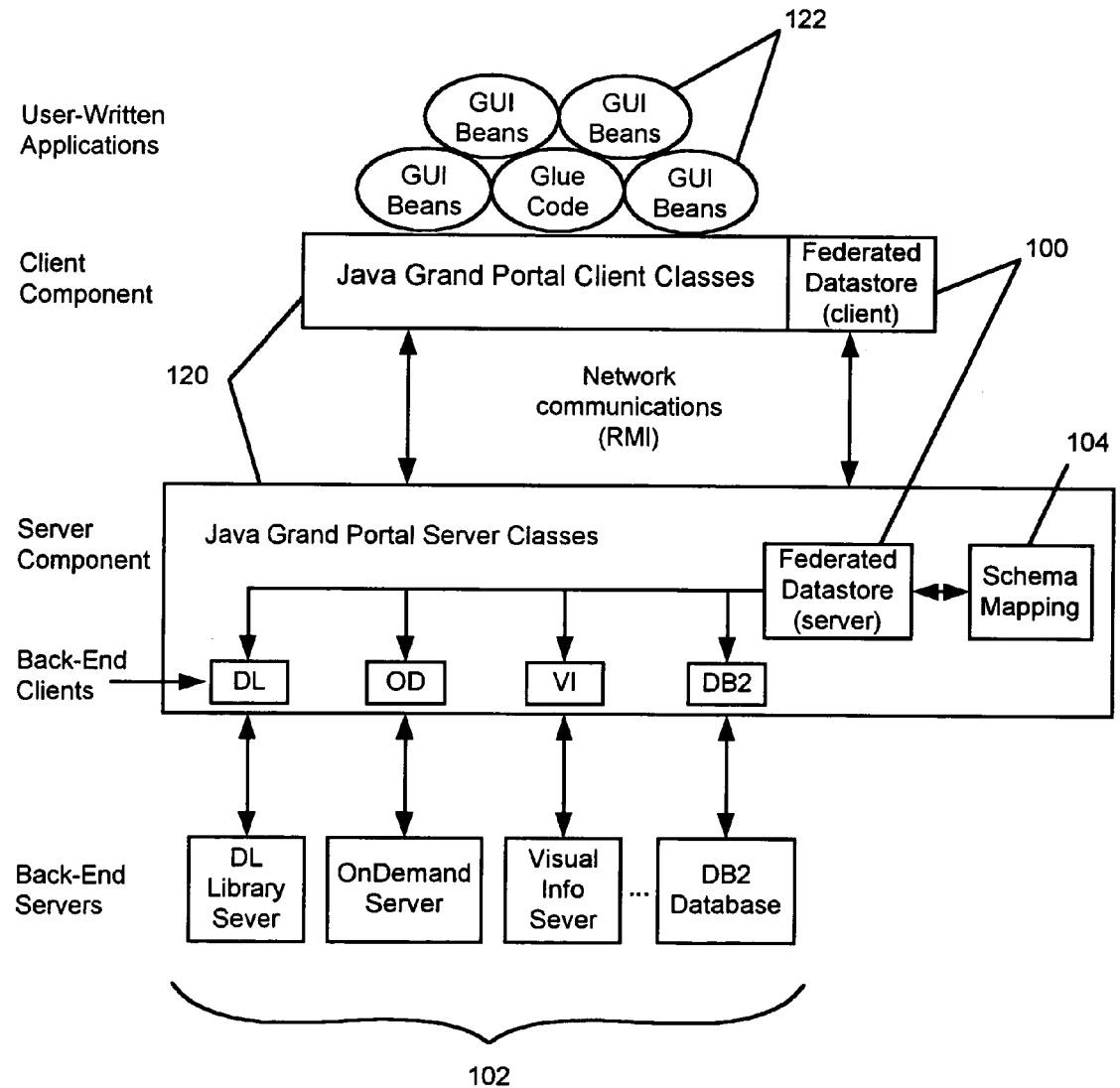
FIG. 1 is a diagram illustrating a computer architecture that could be used in accordance with the present invention.

FIG. 1 is a diagram illustrating a computer architecture that could be used in accordance with the present invention. The present invention is described herein by way of example and is not intended to be limited to the described embodiment. The description of the preferred embodiment is based on, but certainly not limited to, the IBM design of Java Grand Portal Class Library, the Digital Library Java Application Programming Interface (API).

The Java Grand Portal 120 is comprised of client and server classes. In particular, Java Grand Portal is a set of Java classes which provides access and manipulation of local or remote data stored in Digital Library storage facilities. It uses Java APIs based on OMG-Object Query Services (OQS) and a Dynamic Data Object protocol, which is a part of OMG/Persistence Object Services.

The Java APIs provide multi-search capabilities such as:
1. Searching within a given datastore using one or a combination of supported query types, i.e.
   Parametric query—Queries requiring an exact match on the condition specified in the query predicate and the data values stored in the datastore.
   Text query—Queries on the content of text fields for approximate match with the given text search expression, e.g. the existence (or non-existence) of certain phrases or word-stems.
   Image query—Queries on the content of image fields for approximate match with the given image search expression, e.g. image with certain degree of similarity based on color percentages, layout, or texture.
2. Each search type is supported by one or more search-engines.
3. Searching on the results of a previous search.
4. Searching involving heterogeneous datastores.

The Digital Library Grand Portal classes provide a convenient API for Java application users; the applications can be located at local or remote sites. Java classes will typically reside on both server and client sides; both sides providing the same interface. The client side of Java classes communicates with the server side to access data in the Digital Library through the network. Communication between client and server sides is done by these classes; it is not necessary to add any additional programs.

In particular, FIG. 1 is an architectural diagram outlining the structure of the federated search for Digital Library repositories using the federated datastore 100, comprised of a federated datastore client and server. A federated datastore 100 is a virtual datastore which combines several heterogeneous datastores 102 into a consistent and unified conceptual view. This view, or a federated schema, is established via schema mapping 104 of the underlying datastores. The users interact with a federated datastore 100 using the federated schema, without needing to know about the individual datastores 102 which participate in the federated datastore 100.

One embodiment of the invention provides an architecture to enable search gateways as part of a federated search. In one embodiment of the invention, one or more classes implement the architecture to enable search gateways as part of a federated search, and one or more methods are provided to support the architecture. In one embodiment, the class definitions and methods reside at the federated datastore client and server.

The federated datastore 100 does not have a corresponding back-end client. Since it is a virtual datastore, the federated datastore 100 relies on the underlying physical back-end client associated with it, such as the DL client (i.e., Digital Library client), OnDemand, VisualInfo, DB2, etc. Digital Library, OnDemand, VisualInfo, and DB2 are all products from International Business Machines Corporation. As mentioned before, this association is established by a schema mapping component 104.

The communication between the federated datastore 100 client and server can be done by any appropriate protocol.

On top of Java Grand Portal client classes, the users can develop application programs using, for example, any existing Java Beans 122 development environment.

The federated datastore 100 coordinates query evaluation, data-access, and transaction processing of the participating heterogeneous datastores 102. Given the federated schema, a multi-search query can be formulated, executed, and coordinated to produce results in the form of a datastore-neutral dynamic data object.

Note that each heterogeneous datastore and the federated datastore are created using one datastore definition or superclass. The federated datastore 100 and the heterogeneous datastores 102 are all subclasses of a class called Datastore, therefore, all of these datastores 100 and 102 have the same interface. Therefore, a user would be able to access the federated datastore 100 and the heterogeneous datastores 102 in a consistent and uniform manner.

Additionally, the objects stored in the federated datastore 100 and the heterogeneous datastores 102 are subclasses of a Data Object class. The Data Object class includes subclasses for dynamic data objects (DDOs) and extended data objects (XDOs). A DDO has attributes, with type, value, and properties. The value of an attribute can be a reference to another DDO or XDO, or a collection of DDOs or XDOs.

Figure 2:
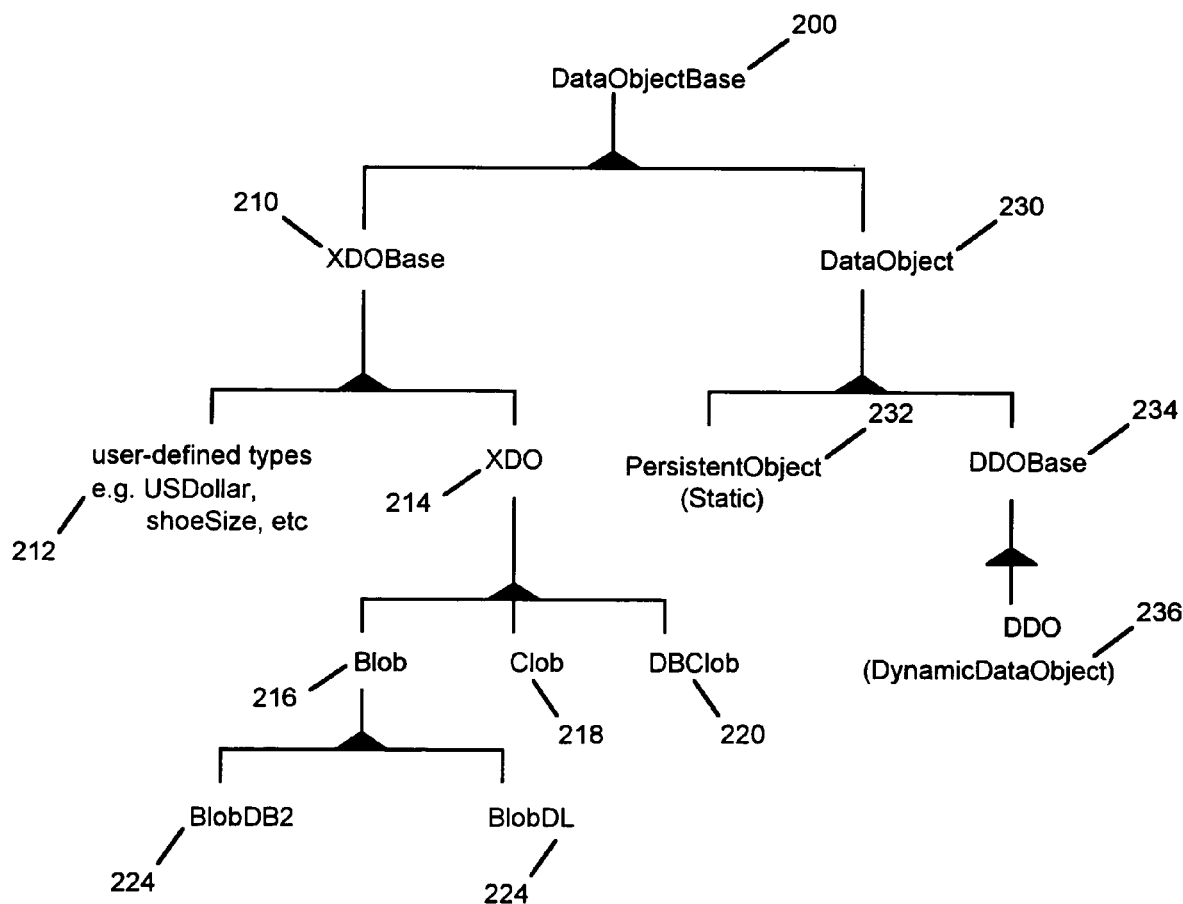
FIG. 2 is a diagram illustrating a class hierarchy for Data Object classes.

FIG. 2 is a diagram illustrating a class hierarchy for Data Object classes. The objects stored in and manipulated by the datastores and fetch operations belong to data object classes. These objects are returned as the result of a fetch, or created and used in CRUD (add, retrieve, update, delete) operations.

A DataObjectBase 200 is an abstract base class for all data objects known by datastores. It has a protocol attribute, that indicates to the datastore which interface can be used to operate on this object. A XDOBase 210 is the base class used to represent user-defined-types (UDT) or large objects. In particular, the XDOBase 210 is the base class for some user-defined types 212 and XDOs 214. A XDO 214 represents complex UDTs or large objects (LOB). This object can exist stand-alone or as a part of a DDO 236. Therefore, it has a persistent object identifier and CRUD operations capabilities.

Blob 216 is a base class for BLOBs as a placeholder to share all generic operations pertaining to BLOBs. Clob 218 is a base class for CLOBs (Character Large Objects) as a placeholder to share all generic operations pertaining to CLOBs. DBClob 220 is a base class for DBCLOBs (database character large object) as a placeholder to share all generic operations pertaining to DBCLOBs. BlobDB2 222 represents a BLOB specific to DB2, and BlobDL 22 represents a BLOB specific to DL. Similarly, though not shown, there may be subclasses for ClobDB2, ClobDL, etc.

A DataObject 230 is a base class for PersistentObject 232 and DDOBase 234. A PersistentObject 232 represents a specific object whose code is statically generated and compiled. This type of object will not be covered in this document. A DDOBase 234 is a base class for a dynamic data object 236 (without the CRUD methods). A DDO (Dynamic Data Object) 236 represents generic data objects which are constructed dynamically at runtime. This object fits well with query and browsing activities in Grand Portal where objects are only known and generated at runtime. It supports the CRUD operations (add, retrieve, update, and delete), and, with the help of its associated datastore, a DDO can put itself into and out of the datastore.

One skilled in the art would recognize that these are only example classes and subclasses and other structures maybe used for objects and other classes or subclasses may be added to or removed from the tree shown in FIG. 2.

With respect to the notion of "federation", each participating datastore preserves the right to maintain its "personality", i.e. its own query language, data-model or schema, method of interaction, etc, and at the same time cooperating in a federation to provide a federated schema. This design allows the users to preserve the natural view to their favorite datastore as well as access them in conjunction with other datastores in a federated context.

The federated datastore 100 can combine the participating native datastores in two ways:

With mapping. As described above, mapping of concepts across participating datastores is established to provide a unified conceptual view. Based on this federated schema, federated queries with both join and union expressions can be formulated.

Without mapping. In this case, the federated datastore 100 only reflects the union of each participating datastore's conceptual view. Although it coordinates query processing and data-access for each underlying datastore, the federated datastore 100 must accept queries in each datastore's native language since the query translation process can not be performed without mapping. In addition, since there is no conceptual mapping between datastores, the FederatedQuery 19 results can only reflect the union of results from each datastore.

The embodiment of the invention is incorporated into one or more software programs that reside at the federated datastore 100. Generally, the software programs and the instructions derived therefrom, are all tangibly embodied in a computer-readable medium, e.g. one or more of the data storage devices, which may be connected to the federated datastore 100. Moreover, the software programs and the instructions derived therefrom, are all comprised of instructions which, when read and executed by the computer system 100, causes the computer system 100 to perform the steps necessary to implement and/or use the present invention. Under control of an operating system, the software programs and the instructions derived therefrom, may be loaded from the data storage devices into a memory of the federated datatstore 100 for use during actual operations.

Thus, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier, or media. Of course, those skilled in the art will recognize many modifications may be made to this configuration without departing from the scope of the present invention.

Those skilled in the art will recognize that the exemplary environment illustrated in FIG. 1 is not intended to limit the present invention. Indeed, those skilled in the art will recognize that other alternative hardware environments may be used without departing from the scope of the present invention.

Federated Datastore

Figure 3:
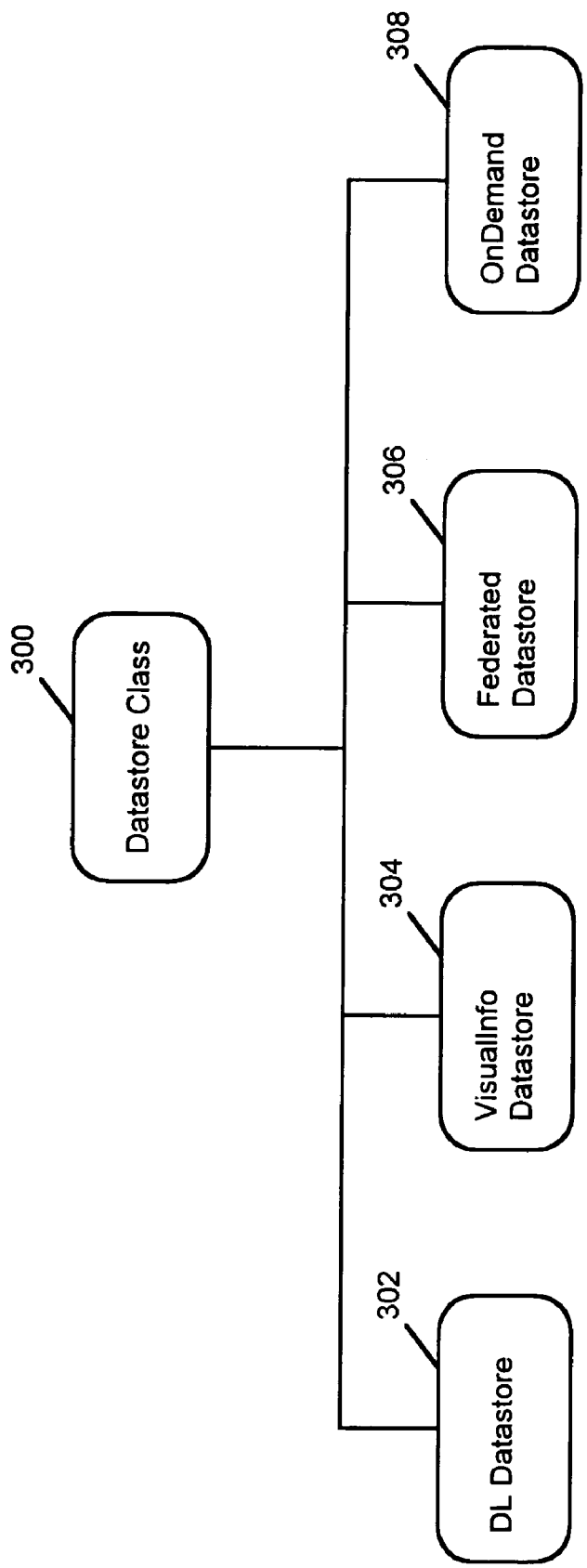
FIG. 3 is a diagram illustrating a class hierarchy for Datastore classes.

FIG. 3 is a diagram illustrating a class hierarchy for Datastore classes. A main datastore class 300 is an abstract base class (i.e., superclass) for all datastores. In particular, some datastore classes that are based on the datastore class 300 and inherit its characteristics are the following: a DL Datastore class 302, a VisualInfo Datastore class 304, a Federated Datastore class 306, and an OnDemand Datastore class 308. It is to be understood that the techniques of the invention may be applied to any data source and is not limited to the mentioned datastores.

Figure 4:
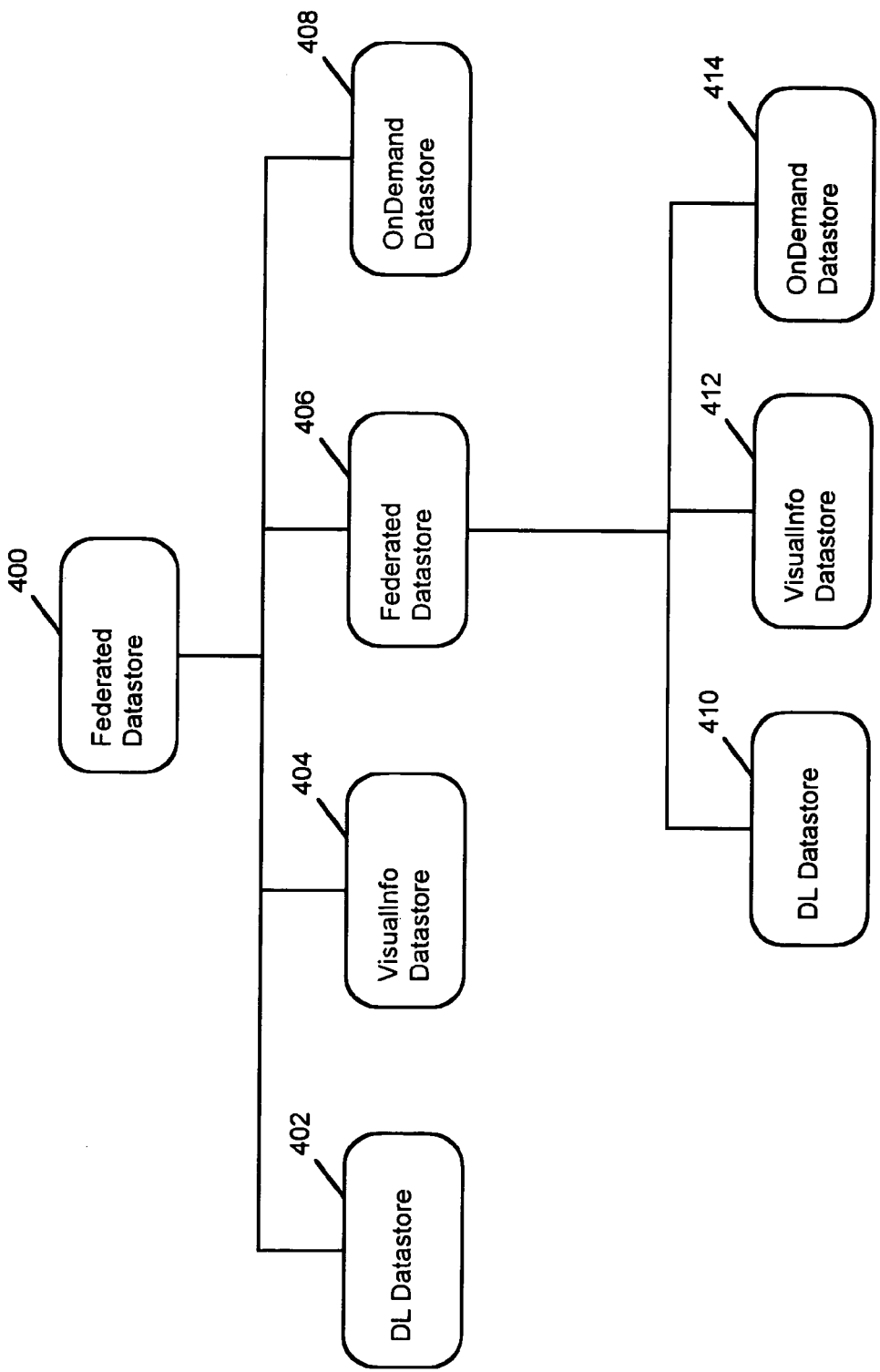
FIG. 4 is a diagram illustrating one composition of a federated datastore.

FIG. 4 is a diagram illustrating one composition of a federated datastore. The federated datastore 400 connects to heterogeneous datastores 402, 404, 406, and 408. As illustrated, a federated datastore 406 may connect to and be nested under federated datastore 400. Additionally, the federated datastore 406 may connect to heterogeneous datastores 410, 412, and 414. The depicted architecture is only a sample, and one skilled in the art would recognize that other examples fall within the scope of the invention.

In the preferred embodiment, the federated datastore 100 takes query strings expressed in a federated query language. An example class definition for DatastoreFederated 100 is set forth below.

DKDatastoreFed.java

```
package com.ibm.mm.sdk.server;
public class DKDatastoreFed extends dkAbstractDataStore
    implements  DKConstantFed,
                DKConstant,
                DKMessageIdFed,
                DKMessageId,
                dkFederation,
                java.io.Serializable
{
public dkCollection listEntities( ) throws DKException, Exception
public String[ ] listEntityNames( ) throws DKException, Exception
public String[ ] listTextEntityNames( ) throws DKException, Exception
public String[ ] listParmEntityNames( ) throws DKException, Exception
public dkCollection listEntityAttrs(String entityName) throws DKException, Exception
public String[ ] listEntityAttrNames(String entityName) throws DKException, Exception
public String registerMapping(DKNVPair sourceMap) throws DKException, Exception
public void unRegisterMapping(String mappingName) throws DKException, Exception
public String[ ] listMappingNames( ) throws DKException, Exception
public dkSchemaMapping getMapping(String mappingName) throws DKException,
    Exception
public synchronized dkExtension getExtension(String extensionName) throws
    DKException, Exception
```

-continued

```
    public synchronized void addExtension(String extensionName,
        dkExtension extensionObj) throws DKException, Exception
    public synchronized void removeExtension(String extensionName) throws
        DKException, Exception
    public synchronized String[ ] listExtensionNames( ) throws DKException, Exception
    public DKDDO createDDO(String objectType,
            int Flags) throws DKException, Exception
    public dkCollection listSearchTemplates( ) throws DKException, Exception
    public String[ ] listSearchTemplateNames( ) throws DKException, Exception
    public dkSearchTemplate getSearchTemplate(String templateName) throws
        DKException, Exception
    public void destroy( ) throws DKException, Exception
    public synchronized string addRemoveCursor (dkResultSetCursor iCurt int action)
        throws DKException, Exception
    public dkDatastore datastoreByServerName (String dsType, String dsName)
        throws DKException, Exception
    public void changePassword (String serverName,
        String user Id,
        String oldPwd,
        String newPwd)
        throws DKException, Exception
    public void requestConnection (String serverName,
        String userId,
        String passwd,
        String connectString)
        throws DKException, Exception
    public void excludeServer (Sting serverName, String templateName)
        throws DKException, Exception
    public boolean isServerExcluded (String serverName, String templateName)
        throws DKException, Exception, java.rmi.RemoteException
    public String[ ] listExcludedServers(String templateName) throws DKException,
        Exception
    public void clearExcludedServers(String templateName) throws DKException,
        Exception
};
```

The following methods are part of the federated datastore class:

public DKDatastoreFed( ) throws DKException, Exception
    Constructs default Federated Datastore.
public DKDatastoreFed(String configuration) throws DKException, Exception
    Constructs default Federated Datastore.
public void connect(String datastore_name,
    String user_name,
    String authentication,
    String connect_string) throws DKException, Exception
    Establishes a connection to a federated datastore.
    Parameters:
        datastore_name—federated datastore name
        user_name—userid to logon to this federated datastore
        authentication—password for this user_name
        connect_string—additional information string
    Throws: DKException
        if either:
        datastore_name, user_name, or authentication is null
        or if error occurs in the federated datastore
    Overrides:
        connect in class dkAbstractDatastore
public void disconnect( ) throws DKException, Exception
    Disconnects from the federated datastore.
    Throws: DKException
        if unable to disconnect from server.
    Overrides:
        disconnect in class dkAbstractDatastore
public Object getOption(int option) throws DKException
    Gets defined datastore option
    Parameters:
        option—an option id
    Returns:
        the value for the given option
    Throws: DKException
        if option is not set
    Overrides:
        getOption in class dkAbstractDatastore
public void setOption(int option, Object value) throws DKException
    Sets the given "option" with a specific "value".
    Parameters:
        option—an option id
        value—the value for the "option"
    Throws: DKException
        if option/value is invalid
    Overrides:
        setOption in class dkAbstractDatastore
public Object evaluate(String command,
    short commandLangType,
    DKNVPair params[]) throws DKException, Exception
    Evaluates a query and returns the result as a dkQueryableCollection object.
    Parameters:
        command—a query sting that represent the query criteria
        commandLangType—a query language type, for Federated, it will be
        DK_FEDERATED_QL_TYPE
        params—a name/value pairs list
    Returns:
        a query result collection
    Throws: DKException
        if "command"argument is null Overrides:
   evaluate in class dkAbstractDatastore
public Object evaluate(dkQuery query) throws DKException, Exception
   Evaluates a query and returns the result as a dkQueryableCollection.
   Parameters:
      query—a given query object
   Returns:
      a query result collection
   Throws: DKException
      if the "query" input is null or not of federated query type.
   Overrides:
      evaluate in class dkAbstractDatastore
public Object evaluate(DKCQExpr qe) throws DKException, Exception
   Evaluates a query.
   Parameters:
      qe—a common query expression object
   Returns:
      a collection of the results
   Throws: DKException
      if common query expression object is invalid
   Overrides:
      evaluate in class dkAbstractDatastore
public dkResultSetCursor execute(String command,
   short commandLangType,
   DKNVPair params[]) throws DKException, Exception
   Executes a command query of the federated datastore and returns a result set cursor.
   Parameters:
      command—a query string that represents the query criteria.
      commandLangType—a query language type, for Federated, it will be DK_FEDERATED_QL_TYPE.
      params[]—a name/value pairs list.
   Returns:
      a dkResultSetCursor object.
   Throws: DKException
      if "command" is null or invalid, or "commandLangType" is not Federated Query type.
   Overrides:
      execute in class dkAbstractDatastore
public dkResultSetCursor execute(dkQuery query) throws DKException, Exception
   Executes a command query of the federated datastore and returns a result set cursor. This method takes a Federated query object as an argument.
   Parameters:
      query—a federated dkQuery object
   Returns:
      a dkResultSetCursor object
   Throws: DKException
      if "query" object is null or query.qlType( ) is not DK_FEDERATED_QL_TYPE
   Overrides:
      execute in class dkAbstractDatastore
public dkResultSetCursor execute(DKCQExpr cqe) throws DKException, Exception
   Executes a query expression.
   Parameters:
      cqe—a common query expression object
   Returns:
      resultSetCursor which represents a federated datastore cursor.
   Throws: DKException
      if "cqe" object is invalid
   Overrides:
      execute in class dkAbstractDatastore
public void executeWithCallback(dkQuery query,
   dkCallback callbackObj) throws DKException, Exception
   Executes a query with callback function.
   Parameters:
      query—a query object
      callbackObj—a dkCallback object
   Overrides:
      executeWithCallback in class dkAbstractDatastore
public void executeWithCallback(String command,
   short commandLangType,
   DKNVPair params[],
   dkCallback callbackObj) throws DKException, Exception
   Execute the query with callback function.
   Parameters:
      command—a query string
      commandLang—a query type
      params—additional query option in name/value pair
      callbackObj—a dkCallback object
   Overrides:
      executeWithCallback in class dkAbstractDatastore
public void executeWithCallback(DKCQExpr cqe,
   dkCallback callbackObj) throws DKException, Exception
   Execute a query expression with callback function.
   Parameters:
      cqe—a common query expression object
      callbackObj—a dkCallback object
   Overrides:
      executeWithCallback in class dkAbstractDatastore
public dkQuery createQuery(String command,
   short commandLangType,
   DKNVPair params[]) throws DKEception
   Creates a federated query object.
   Parameters:
      command—a query string that represents the query criteria
      commandLangType—a query language type, it will be one of the following:
         DK_CM_TEMPLATE_QL_TYPE
         DK_CM_TEXT_QL_TYPE
         DK_CM_IMAGE_QL_TYPE
         DK_CM_PARAMETRIC_QL_TYPE
         DK_CM_COMBINED_QL_TYPE
      params[]—a name/value pairs list
   Returns:
      a federated dkQuery object
   Throws: DKException
      if "command" is null
   Overrides:
      createQuery in class dkAbstractDatastore
public dkQuery createQuery(DKCQExpr qe) throws DKException
   Creates a query object.
   Parameters:
      cqe—a common query expression object
   Throws: DKException
      if "cqe" object is invalid
   Overrides:
      createQuery in class dkAbstractDatastore
public dkCollection listDataSources( ) throws DKException List the available datastore sources that a user can connect to.
Returns:
    a collection of ServerDef objects describing the servers
Throws: DKException
    if internal error occurs from server
Overrides:
    listDataSources in class dkAbstractDatastore
public String[]listDataSourceNames( ) throws DKException
Gets a list of datasource names.
Returns:
    an array of datasource names
Throws: DKException
    if error occurs when retrieving datasource names
Overrides:
    listDataSourceNames in class dkAbstractDatastore
public void addObject(dkDataObject dataobj) throws DKException, Exception
Adds a DDO object.
Parameters:
    ddo—a Federated object to be added.
Throws: DKException
    if error occurs during add.
Overrides:
    addObject in class dkAbstractDatastore
public void deleteObject(dkataObject dataobj) throws DKException, Exception
Deletes a data object.
Parameters:
    ddo—a federated DDO object to be deleted
Throws: DKException
    if error occurs during delete.
Overrides:
    deleteObject in class dkAbstractDatastore
public void retrieveObject(dkDataObject dataobj) throws DKException, Exception
Retrieves a data-object.
Parameters:
    ddo—document object to be retrieved.
Throws: DKException
    when retrieve failed.
Overrides:
    retrieveObject in class dkAbstractDatastore
public void updateObject(dkDataObject dataobj) throws DKException, Exception
Updates a data-object.
Parameters:
    ddo—the data-object to be updated.
Throws: DKException
    if error occurs in the datastore
Overrides:
    updateObject in class dkAbstractDatastore
public void commit( ) throws DKException
Commits all activities since the last commit.
Throws: DKException
    is thrown since federated datastore does not support transaction scope for now.
Overrides:
    commit in class dkAbstractDatastore
public void rollback( ) throws DKException
Rolls back all activities since the last commit.
Throws: DKException
    is thrown since Federated does not support transaction scope for now.
Overrides:
    rollback in class dkAbstractDatastore
public boolean isConnected( )
Checks to see if the datastore is connected
Returns:
    true if connected, false otherwise
Overrides:
    isConnected in class dkAbstractDatastore
public DKHandle connection( ) throws Exception
Gets the connection handle for the datastore.
Returns:
    the connection handle
Overrides:
    connection in class dkAbstractDatastore
public DKHandle handle(String type) throws Exception
Gets a datastore handle.
Parameters:
    type—type of datastore handle wanted
Returns:
    a datastore handle
Overrides:
    handle in class dkAbstractDatastore
public String userName( )
Gets the user name that user used to logon to the datastore.
Returns:
    the userid that user used to logon
Overrides:
    userName in class dkAbstractDatastore
public String datastoreName( ) throws Exception
Gets the name of this datastore object. Usually it represents a datastore source's server name.
Returns:
    datastore name
Overrides:
    datastoreName in class dkAbstractDatastore
public String datastoreType( ) throws Exception
Gets the datastore type for this datastore object.
Returns:
    datastore type
Overrides:
    datastoreType in class dkAbstractDatastore
public dkDatastoreDef datastoreDef( ) throws DKException, Exception
Gets datastore definition.
Returns:
    the meta-data (dkDatastoreDef) of this datastore
Overrides:
    datastoreDef in class dkAbstractDatastore
public dkCollection listEntities( ) throws DKException, Exception
Gets a list of federated entities from Federated server.
Returns:
    a collection of dkEntityDef
Throws: DKException
    if error occurs
Overrides:
    listEntities in class dkAbstractDatastore
public String[] listEntityNames( ) throws DKException, Exception
Gets a list of federated entities names from Federated server.
Returns:
    an array of names
Throws: DKException
    if error occurs
Overrides:
    listEntityNames in class dkAbstractDatastore
public String[] listTextEntityNames( ) throws DKException, Exception
Gets a list of federated text search entities names from Federated server.
Returns:
an array of names
Throws: DKException
if error occurs
public String[] listParmEntityNames( ) throws DKException, Exception
Gets a list of federated parametric search entities names from Federated server.
Returns:
an array of names
Throws: DKException
if error occurs
Overrides:
listEntityAttrs
public dkCollection listEntityAttrs(String entityName) throws DKException, Exception
Gets a list of attributes for a given entity name.
Parameters:
entityName—name of entity to retrieve attributes for
Returns:
a dkCollection of dkAttrDef objects
Throws: DKException
if the entity name does not exist
Overrides:
listEntityAttrs in class dkAbstractDatastore
public String[] listEntityAttrNames(String entityName) throws DKException, Exception
Gets a list of attribute names for a given entity name.
Parameters:
entityName—name of entity to retrieve attribute names for
Returns:
an array of attribute names
Throws: DKException
if the entity name does not exist
Overrides:
listEntityAttrNames in class dkAbstractDatastore
public String registerMapping(DKNVPair sourceMap) throws DKException, Exception
Registers a mapping definition to this datastore. Mapping is done by entities.
Parameters:
sourceMap—source name and mapping, a DKNVPair class with the following possible values:
("BUFFER",): buffer_ref is a reference to a string in memory
("FILE",): file_name is the name of the file containing the mapping
("URL",): URL-address location of the mapping
("LDAP",): LDAP file-name
("SCHEMA",): a reference to a dkSchemaMapping object defining the mapping. Currently, only "SCHEMA" option is supported, others may be added later.
Returns:
the name of the mapping definition.
Overrides:
registerMapping in class dkAbstractDatastore
See Also:
unRegisterMapping
public void unRegisterMapping(String mappingName) throws DKException, Exception
Unregisters mapping information from this datastore.
Parameters:
mappingName—name of the mapping information
Overrides:
unRegisterMapping in class dkAbstractDatastore
See Also:
registerMapping
public String[] listMappingNames( ) throws DKException, Exception
Gets the list of the registered mappings for this datastore.
Returns:
an array of registered mapping objects' names. The array length would be zero if there is no mapping registered.
Overrides:
listMappingNames in class dkAbstractDatastore
See Also:
registerMapping
public dkSchemaMapping getMapping(String mappingName) throws DKException, Exception
Gets mapping information from this datastore.
Parameters:
mappingName—name of the mapping information
Returns:
the schema mapping object
Overrides:
getMapping in class dkAbstractDatastore
See Also:
registerMapping
public synchronized dkExtension getExtension(String extensionName) throws DKException, Exception
Gets the extension object from a given extension name.
Parameters:
extensionName—name of the extension object.
Returns:
extension object.
Overrides:
getextension in class dkAbstractDatastore
public synchronized void addExtension(String extensionName, dkExtension extensionObj) throws DKException, Exception
Adds a new extension object.
Parameters:
extensionName—name of new extension object
extensionObj—the extension object to be set
Overrides:
addextension in class dkAbstracdDatastore
public synchronized void removeExtension(String extensionName) throws DKException, Exception
Removes an existing extension object.
Parameters:
extensionName—name of extension object to be removed
Overrides:
removeExtension in class dkAbstractDatastore
public synchronized String[] listExtensionNames( ) throws DKException, Exception
Gets the list of extension objects' names.
Returns:
an array of extension objects' names
Overrides:
listExtensionNames in class dkAbstractDatastore
public DKDDO createDDO(String objectType, int Flags) throws DKException, Exception
Creates a new DDO with object type, properties and attributes set for a given back-end server.

Parameters:
  objectType—the object type
  Flags—to indicate various options and to specify more detailed characteristics of the DDO to create. For example, it may be a directive to create a document DDO, a folder, etc.
Returns:
  a new DDO of the given object type with all the properties and attributes set, so that the user only needs to set the attribute values
Overrides:
  createDDO in class dkAbstractDatastore
public dkCollection listSearchTemplates( ) throws DKException, Exception
  Gets a list search templates from a federated server.
Returns:
  a DKSequentialCollection of search templates
Throws: DKException
  if internal datastore error occurs
public String[] listSearchTemplateNames( ) throws DKException, Exception
  Gets a list search templates' names from a federated server.
Returns:
  an array of search template names
Throws: DKException
  if internal datastore error occurs
public dkSearchTemplate getSearchTemplate(String templateName) throws DKException, Exception
  Gets a search template information from a given template name.
Returns:
  dkSearchTemplate object.
Throws: DKException
  if internal datastore error occurs
public void destroy( ) throws DKException, Exception
  datastore destroy—datastore cleanup if needed
Overrides:
  destroy in class dkAbstractDatastore
public synchronized string addRemoveCursor (dkResultSetCursor iCurt int action) throws DKException, Exception
public dkDatastore datastoreByServerName (String dsType, String dsName) throws DKException, Exception
  Gets a reference to the specified datastore. The datastore must be connected, otherwise it will return null even if one is found. First, it will look in the free connection pool. If none found, it will look under the connection pool held by active cursors.
public void changePassword (String serverName,
  String user Id,
  String oldPwd,
  String newPwd)
  throws DKException, Exception
  Changes the password of a given user Id for a specified server. Administrator only function.
Parameters:
  userId—the user-id
  oldPwd—the old password
  newPwd—the new password
public void requestConnection (String serverName,
  String userId,
  String passwd,
  String connectString)
  throws DKException, Exception
  Requests a connection to a particular server with the given userid, password & connectString.
Parameters:
  userId—the user Id
  passwd—the password
  connectString—the connect string to logon
public void excludeServer (Sting serverName, String templateName) throws DKException, Exception
  Requests the namned server to be skipped for the named search template.
Parameters:
  serverName—a back end server name
  templateName—a search template name
public boolean isServerExcluded (String serverName, String templateName) throws DKException, Exception, java.rmi.RemoteException
  Checks if the given server is in the excluded list for the named search template.
Parameters:
  serverName—a back end server name
  templateName—a search template name
Returns:
  true or false
public String[] listExcludedServers(String templateName) throws DKException, Exception
  Lists all the excluded servers for the named search template
Parameters:
  s—templateName—a search template name
Returns:
  an array of server names that were excluded during search
public void clearExcludedServers(String templateName) throws DKException, Exception
  Clears all the excluded servers for the named search template
Parameters:
  s—templateName—a search template name The following is sample syntax of a federated cquery string. However, it is to be understood that other syntax, including other parameters, may be used for the federated query string without departing from the scope of the invention.

```
PARAMETRIC_SEARCH=([ENTITY=entity_name,]
                   [MAX_RESULTS=maximum_results,]
                   [COND=(conditional_expression)]
                   [; . . .]
                  );
                  [OPTION=([CONTENT=yes_no]
                           )]
                  [and_or
```

-continued

```
TEXT_SEARCH=(COND=(text_search_expression)
        );
    [OPTION=([SEARCH_INDEX={search_index_name | (index_list) };]
            [MAX_RESULTS=maximum_results;]
            [TIME_LIMIT=time_limit]
            )]
]
[and_or
IMAGE_SEARCH=(COND=(image_search_expression)
        );
    [OPTION=({SEARCH_INDEX={search_index_name | (index_list) };]
            [MAX_RESULTS=maximum_results;]
            [TIME_LIMIT=time_limit]
            )]
]
```

There are several mechanisms for users to submit federated queries for execution. For example, users can create a federated query string and pass it to a federated query object and then invoke an execute or evaluate method on that object to trigger the query processing. Alternatively, a user can pass the federated query string to the execute or evaluate method in the federated datastore to process the query directly. The query string will be parsed into a federated query canonical form (query expression), which is essentially a datastore neutral representation of the query. In case the input query comes from a graphical user interface (GUI) based application, the query does not need to be parsed and the corresponding canonical form can be directly constructed.

The query canonical form is the input for the federated query processor module. This module will perform the following tasks:

Query translation. Translates the query canonical form into several native queries that corresponds to each native datastore associated to this federated datastore. The translation information is obtained from the schema mapping.

Data conversion. Converts data in the query into a native data type for each of the associated native datastores. This process uses the mapping and conversion mechanisms described in the schema mapping.

Data filtering. Filters only the relevant data during the construction of native queries.

Each native query is submitted to the corresponding native datastore for execution. Initially, the results returned are cursors to the data in each datastore.

The end-result of an initial query is a federated result set cursor object, which is a virtual collection (i.e., at this time, data has not actually been retrieved) of cursors to objects in each of the native datastores.

The user can retrieve the actual data using a fetch. When a fetch is issued for data, the data is returned by the native datastores to the federated query results processor module, which will do the following:

Data conversion. Converts data from the native type into a federated type according to the mapping information.

Data filtering. Filters the results to include only the requested data.

Result merging. Merges the results from several native datastores into a federated collection.

The federated result set cursor object provides the facility to separate query results according to the source native datastores. To do such a processing, the user/application may either use the federated cursor to fetch data or a native datastore cursor to fetch data from a particular datastore.

A FederatedQuery represents and executes queries across heterogeneous datastores. This query can be a combination of a DL parametric query, OnDemand query, and other query types involving supported datastores. To retrieve data from each datastore, the federated datastore delegates the query processing task to each of the native datastores.

*DKFederatedQuery.java*

```
package com.ibm.mm.sdk.common.DKFederatedQuery
public class DKFederatedQuery
    extends Object
    implements dkQuery, DKConstant, DKMessageId, Serializable
{
public DKFederatedQuery(dkDatastore creator.
    String queryString)
public DKFederatedQuery(dkDatastore creator,
public DKFederatedQuery(DKFederatedQuery fromQuery)
public void prepare(DKNVPair params[ ] ) throws DKException, Exception
public void execute(DKNVPair params[ ] ) throws DKException, Exception
public int status( )
public Object result( ) throws DKException, Exception
public dkResultSetCursor resultSetCursor( ) throws DKException, Exception
public short qlType( )
public String queryString( )
public dkDatastore getDatastore( )
```

-continued

```
public void setDatastore(dkDatastore ds) throws DKException, Exception
public String getName( )
public void setName(String name)
public int numberOfResults( )
};
```

The following methods are part of the federated query class:

public DKFederatedQuery(dkDatastore creator, String queryString)
Constructs a Federated query.
Parameters:
creator—datastore
queryString—a query string
public DKFederatedQuery(dkDatastore creator, DKCQExpr queryExpr)
Constructs a Federated query
Parameters:
creator—datastore
queryExpr—a query expression
public DKFederatedQuery(DKFederatedQuery fromQuery)
Constructs a Federated query from a Federated query object.
Parameters:
fromQuery—Federated query
public void prepare(DKNVPair params[]) throws DKException, Exception
Prepares a query.
Parameters:
params—additional prepare query option in name/value pair
public void execute(DKNVPair params[]) throws DKException, Exception
Executes a query.
Parameters:
params—additional query option in name/value pair
public int status( )
Gets query status.
Returns:
query status
public Object result( ) throws DKException, Exception
Gets query result.
Returns:
query result in a DKResults object
public dkResultSetCursor resultSetCursor( ) throws DKException, Exception
Gets query result.
Returns:
query result in a dkResultSetCursor object
public short qlType( )
Gets query type.
Returns:
query type
public String queryString( )
Gets query string
Returns:
query string
public dkDatastore getDatastore( )
Gets the reference to the owner datastore object.
Returns:
the dkDatastore object
public void setDatastore(dkDatastore ds) throws DKException, Exception
Sets the reference to the owner datastore object.
Parameters:
ds—a datastore
public String getName( )
Gets query name.
Returns:
name of this query
public void setName(String name)
Sets query name.
Parameters:
name—new name to be set to this query object
public int numberOfResults( )
Gets the number of query results.
Returns:
number of query results Schema Mapping A schema mapping represents a mapping between the schema in a datastore with the structure of the data-object that the user wants to process in memory. Schema mapping has been generally described in U.S. patent application Ser. Nos. 08/276,382 and 08/276,747, also assigned to IBM.

A federated schema is the conceptual schema of a federated datastore 100, which defines a mapping between the concepts in the federated datastore 100 to concepts expressed in each participating datastore schema. In general, a schema mapping handles the difference between how the data are stored in the datastore (as expressed by the datastore's conceptual schema) and how the user wants to process them in the application program. This mapping can also be extended to incorporate relationship associations among entities in a federated datastore, e.g., associating an employee's name with the appropriate department name. Since the mapping process can be a bit tedious, it is usually done with the help of a typical GUI-oriented schema mapping program.

In addition to schema-mapping information involving the mapping of entities and attributes, a federated datastore 100 must also have access to the following information:

User-id and password mapping. To support single sign-on features, each user-id in the federated datastore 100 needs to be mapped to its corresponding user-ids in the native datastores.

Datastore registration. Each native datastore needs to be registered so it can be located and logged-on to by the federated datastore 100 processes on behalf of its users.

An Architecture to Enable Search Gateways as Part of a Federated Search

An embodiment of the invention provides a search gateway architecture. The search gateway architecture enables search gateways as part of a federated search. In particular, the search gateway architecture enables adding additional search gateways.

The search gateway architecture extends the integrated architecture for federation of heterogenous datastores to enable search gateways to participate in a federated search. In one embodiment, a search gateway is Domino Extended Search (DES) from Lotus Development Corporation.

The Grand Portal architecture provides a consistent framework for developing client/server application programs for multi-search and update on a single datastore or on multiple heterogenous datastores participating in a federation. The datastores can be of the same or different types, and in a mixture of local or client/server configurations. Other federated datastores can also participate in this mixture to form a search tree of datastores. Moreover, several different search-engines, such as text search and image search engines, can be added to this mixture.

In the current architecture of Grand Portal for a federated search, a federated datastore can be composed of a combination of several heterogenous datastores, including a second federated datastore, recursively. With the exception of the second federated datastore, each other datastore can be viewed as a "terminal data repository", as these datastores do not have the capability to expand the search to other data repositories. That is, terminal data repositories perform searches only at their datastore.

The search gateway architecture extends the Grand Portal system to allow a search gateway (i.e., a search gateway data source), such as Domino Extended Search (DES), to participate in the federation. It is to be understood that the DES search gateway is only one example of a search gateway, and other search gateways may be used. The DES search gateway is a datastore that is defined using a DES datastore class that depends from a base datastore class, from which the classes for the federated datastore and the terminal data repositories (e.g., native datastores) depend.

However, the difference between a DES datastore and a regular datastore is that a DES datastore can expand its search to several other data repositories, such as a Lotus Notes Database, a Web Search (i.e., searching the World Wide Web), a file system, and a Relational Database (e.g., DB2, Oracle or ODBC databases). Due to its characteristics, a DES datastore can be viewed as a search gateway, as opposed to a terminal data repository.

An advantage of this search gateway architecture is that it extends the Grand Portal architecture to allow a combination of multiple heterogenous "regular" datastores, federated datastores, and search gateways to participate in a federated search. In addition, several different search-engines, such as, text search and image search engines, can be added to the federated search to enrich the combined multi-search capability of the system.

Domino Extended Search (DES), is a product from Lotus Development Corporation, designed for searching several data repositories, such as Lotus Notes Database, the Web, a File System, and a Relational Database. Since a DES datastore has the ability to search several different data sources, it is considered to be a search gateway.

The search gateway architecture extends the Grand Portal system in several ways. The Grand Portal class library is extended to include classes to support searching via the DES gateway, either from a client or a server configuration via DKDastoreDES and its related classes. This is considered as a stand-alone search to a DES gateway using the framework established by the Grand Portal architecture. A sample DES query class used for searching will be described below. Moreover, the federal search is extended to include a DES gateway as part of the federation.

Figure 5:
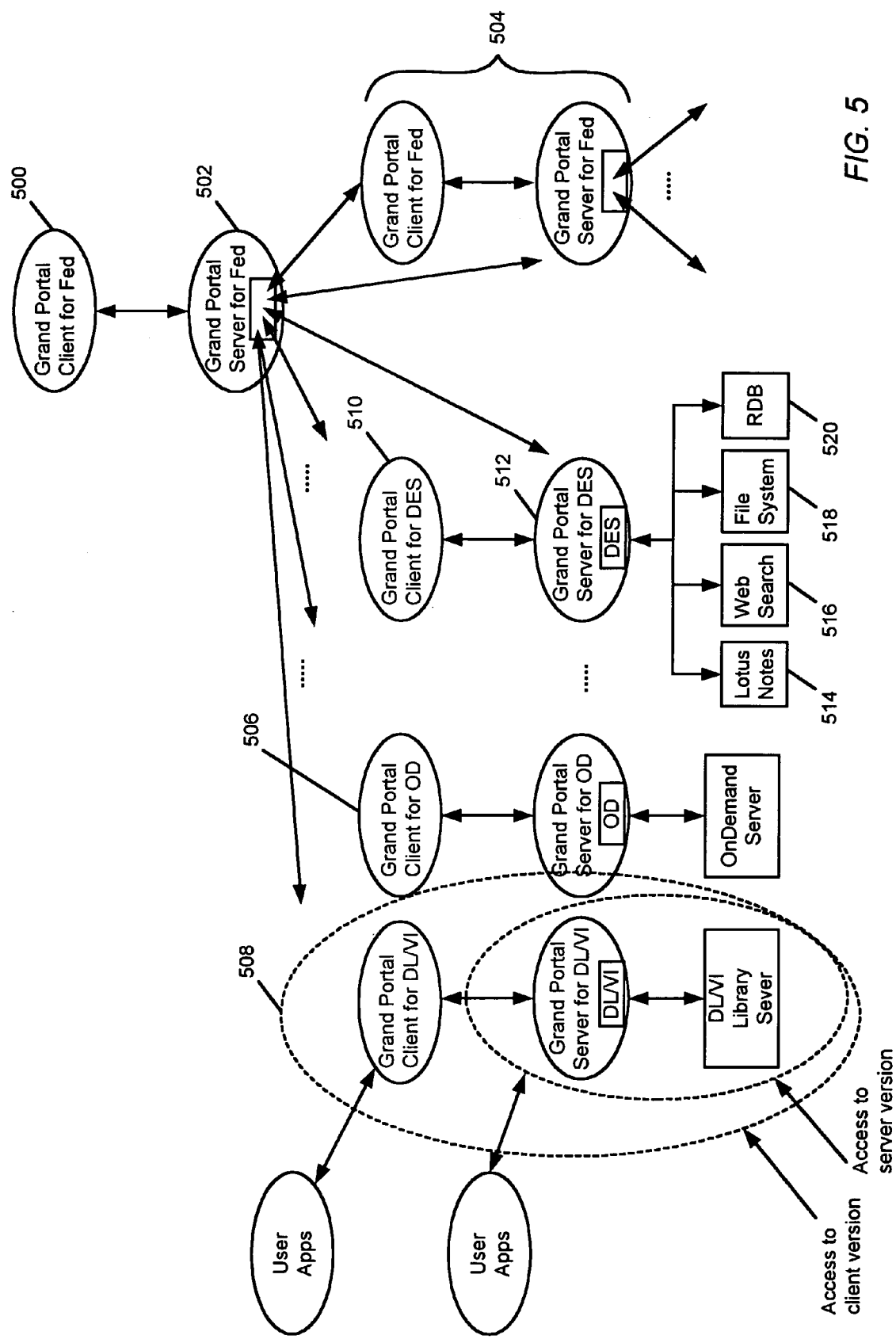
FIG. 5 is a diagram of an extended Grand Portal architecture.

FIG. 5 is a diagram of an extended Grand Portal architecture. A Grand Portal client for a federated client datastore 500 is connected to a Grand Portal server for a federated server datastore 502. Another federated client/server system 504 may be connected to the federated server 502. A Grand Portal client/server system for an OnDemand (OD) datastore 506 may be part of the federation. Additionally, a Grand Portal client/server system for a Digital Library/VisualInfo (DL/VI) datastore 508 may be part of the federation. As with any of the datastores discussed herein, a user may access the client or the server directly. Therefore, user applications may reside at either the client or the server.

A Grand Portal client for a DES datastore 510 or a Grand Portal server for a DES datastore 512 may each be connected to the federation. While the DL/VI datastore enables searching a DL/VI Library server and the OD datastore enables searching of an OnDemand datastore, the DES datastore enables searching of multiple other datastores. In particular, the DES datastore enables searching of a Lotus Notes server 514, a Web 516, a file system 518, and a relational database 520.

Figure 6:
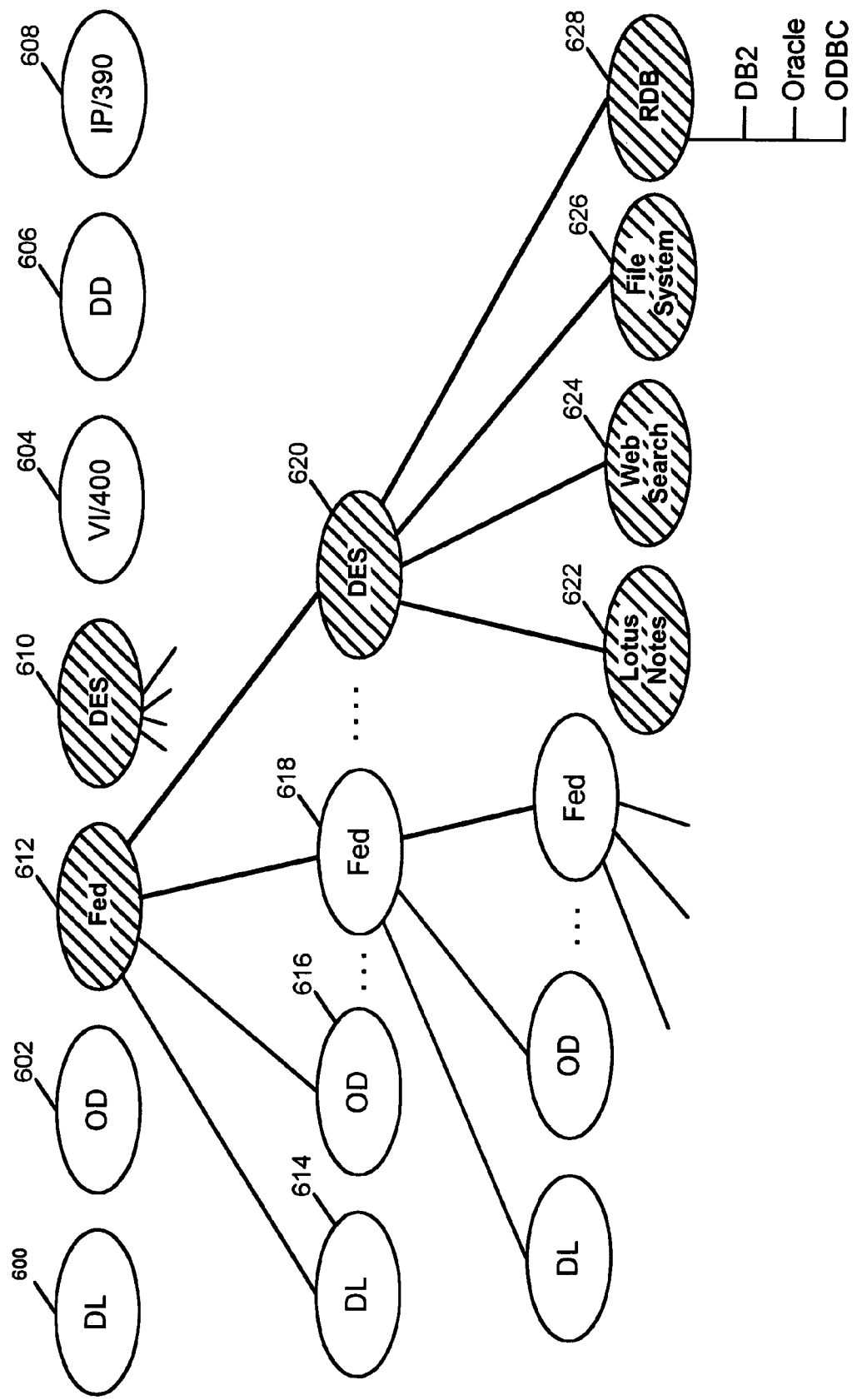
FIG. 6 is a diagram illustrating individual datastores and federated compositions.

FIG. 6 is a diagram illustrating individual datastores and federated compositions. In particular, a datastore can be configured as a stand-alone or as part of a federation. Additionally, a federated datastore can be composed of any number of datastores, including other federated datastores. Stand-alone datastores may be accessed directly by a user. The following are example stand-alone datastores in FIG. 6: a Digital library (DL) datastore 600, an OnDemand datastore 602, a VisualInfo/400 datastore 604, a Domino.Doc datastore 606, or a ImagePlus/390 datastore 608. Additionally, a DES datastore 610 maybe a stand alone in that it is not part of a federated composition. A federated composition 612 may include individual datastores 614 and 616, another federated datastore 618, and a search gateway to a DES datastore 620. In turn, the DES datastore 620 enables searching a Lotus Notes database 622, searching the Web 624, searching a file system 626, or searching a relational database 628 (e.g., DB2, Oracle, or ODBC).

The novelty and uniqueness of the search gateway architecture is in demonstrating that the Grand Portal architecture is rich and robust enough to allow a user to compose a search in the following configurations:

1. Search against a single datastore either from a client or a server configuration. Depending on the target datastore features, the search gateway architecture may support multi-search involving several different search engines (text and image search) or an update function. In this case, the datastore could be a gateway.
2. Non-federated search against several datastores. Non-federated means that there is no mapping used. The user manages the search to each native datastore and processes the results according to a specific application to solve a specific problem. In this case, the datastore could be a gateway.
3. Federated search across several datastores, including gateways and other federated datastores
4. A mixture of 2 and 3.

5. Search in a combination of different platforms (e.g., AIX, NT/Win98) using a variety of languages (e.g., Java, C++, Visual Basic)

An example class definition for a DES datastore (DKDatastoreDES.java) is set forth below. DKDatastoreDES is a specific version of dkDatastore to implement a Lotus Domino Extended Search datastore. DKDatastoreDES provides Documents, Parts and Folders, storage and retrieval mechanisms, as well as search and other document processing capabilities supported by DES.

*DKDatastoreDES.java*

```
package com.ibm.mm.sdk.server.DKDatastoreDES
public class DKDatastoreDES extends dkAbstractDatastore
        implements DKConstantDES, DKMessageIdDES
{
public DKDatastoreDES( ) throws DKException, Exception
public DKDatastoreDES (String configuration) throws DKException, Exception
public void connect(String datastore_name
        String userName,
        String authentication,
        String connect_string) throws DKException, Exception
public Object getOption(int option) throws DKException, Exception
public void setOption(int option,
        Object value) throws DKException, Exception
public Object evaluate(String command, short commandLangType,
        DKNVPair params[ ]) throws DKException, Exception
public Object evaluate(dkQuery query) throws DKException, Exception
public Object evaluate(DKCQExpr qe) throws DKException, Exception
public dkResultSetCursor execute(String command,
        short commandLangType,
        DKNVPair params[ ]) throws DKException, Exception
public dkResultSetCursor execute(dkQuery query) throws DKException, Exception
public dkResultSetCursor execute(DKCQExpr cqe) throws DKException, Exception
public void executeWithCallback(dkQuery query,
        dkCallback callbackObj) throws DKException, Exception
public void executeWithCallback(String command,
        short commandLangType,
        DKNVPair params[ ],
        dkCallback callbackObj) throws DKException, Exception
public void executeWithCallback(DKCQExpr qe,
        dkCallback callbackObj) throws DKException, Exception
public dkQuery createQuery(String command,
        short commandLangType,
        DKNVPair params [ ]) throws DKException, Exception
public dkQuery createQuery(DKCQExpr qe) throws DKException, Exception
public void retrieveObject(dkDataObject ddo) throws DKException, Exception
public void disconnect( ) throws DKException., Exception
public boolean isConnected( ) throws Exception
public String datastoreName( ) throws Exception
public DKHandle handle(String type) throws Exception
public DKHandle connection( ) throws Exception
public String datastoreType( ) throws Exception
public String userName( ) throws Exception
public dkCollection listDataSources( ) throws DKException
public String[ ] listDataSourceNames( ) throws DKException
public dkCollection listEntities( ) throws DKException, Exception
public String[ ] listEntityNames( ) throws DKException, Exception
public dkCollection listEntityAttrs(String entityName) throws DKException, Exception
public String[ ] listEntityAttrNames(String entityName) throws DKException, Exception
public dkDatastoreDef datastoreDef( )
public String registerMapping(DKNVPair sourceMap) throws DKException, Exception
public void unRegisterMapping(String mappingName) throws DKException, Exception
public String[ ] listMappingNames( ) throws DKException, Exception
public dkSchemaMapping getMapping(String mappingName) throws DKException,
Exception
public DKDDO createDDO(String objectType,
        int Flags) throws DKException, Exception
public synchronized dkExtension getExtension(String extensionName) throws DKException,
        Exception
public synchronized void addExtension(String extensionName,
        dkExtension extensionObj) throws DKException, Exception
public synchronized void removeExtension(String extensionName) throws DKException,
        Exception
public synchronized String[ ] listExtensionNames( ) throws DKException, Exception
public DKCQExpr translate(DKCQExpr cqe) throws DKException, Exception
public void addObject(dkDataObject ddo) throws DKException, Exception
public void deleteObject(dkDataObject ddo) throws DKException, Exception
public void updateObject(dkDataObject ddo) throws DKException, Exception
public void commit( ) throws DKException, Exception
public void rollback( ) throws DKException, Exception
public Object listSchema( ) throws DKException, Exception
```

-continued

```
public Object listSchemaAttributes(String schemaEntry) throws DKException, Exception
public void destroy( ) throws DKException, Exception
}
```

The following methods are part of the DES datastore class:

*public DKDatastoreDES( ) throws DKException, Exception*
    Constructs the datastore and initializes the datastore with the default CC2MIME object.
*public DKDatastoreDES(String configuration) throws DKException, Exception*
    Constructs the datastore and initializes the datastore with the DKCC2Mime object based on the configuration string
    Parameters:
        configuration - - info about location of the CC2MIME file
*public void connect(String datastore_name,*
        *String userName,*
        *String authentication,*
        *String connect_string) throws DKException, Exception*
    Connects to a datastore.
    Parameters:
        datastore_name - DES server TCP/IP address
        userName - the user name used for connection
        authentication - the password used for connection
        connect_string - a string that supplies connection parameters to establish
            and maintain a connection to the DES server. Valid parameters are:
            PORT=value
            The port number for the DES server address. This MUST be specified.
            DESAPPID=value
            The Application Id for DES to control access to specific databases.
            This MUST be specified.
            DESAPPPW=value
            The Application Id password. This MUST be specified.
    Throws: DKException
        - DKUsageError: if either datastore_name, userName, authentication or
        connect_string is null.
        - DKDatastoreError: if connecting to the DES back-end server is not
        successful.
    Throws: Exception
        if an error occurs in the java classes.
    Overrides:
        connect in class dkAbstractDatastore
*public Object getOption(int option) throws DKException, Exception*
    Gets a datastore option.
    Parameters:
        option - the option identifier
    Returns:
        an option value
    Overrides:
        getOption in class dkAbstractDatastore
*public void setOption(int option,*
        *Object value) throws DKException, Exception*
    Sets a datastore option.
    Parameters:
        option - the option identifier
        value - the option value
    Overrides:
        setOption in class dkAbstractDatastore
*public Object evaluate(String command,*
        *short commandLangType,*
        *DKNVPair params[ ]) throws DKException, Exception*
    Evaluates the query.
    Parameters:
        command - a query string
        commandLang - a query type
        params - additional query option in name/value pair
    Returns:
        a collection of the results
    Overrides:
        evaluate in class dkAbstractDatastore
*public Object evaluate(dkQuery query) throws DKException, Exception*
    Evaluates the query.

```
    Parameters:
        query - a query object
    Returns:
        a collection of the results
    Overrides:
        evaluate in class dkAbstractDatastore
public Object evaluate(DKCQExpr qe) throws DKException, Exception
    Evaluates a query.
    Parameters:
        qe - a common query expression object
    Returns:
        a collection of the results
    Overrides:
        evaluate in class dkAbstractDatastore
public dkResultSetCursor execute(String command,
    short commandLangType,
    DKNVPairparams[ ]) throws DKException, Exception
    Executes a query.
    Parameters:
        command - a query string
        commandLang - a query type
        params - additional query option in name/value pair
    Returns:
        resultSetCursor which represents a datastore cursor.
    Overrides:
        execute in class dkAbstractDatastore
public dkResultSetCursor execute(dkQuery query) throws DKException, Exception
    Executes a query.
    Parameters:
        query - a query object
    Returns:
        resultSetCursor which represents a datastore cursor.
    Overrides:
        execute in class dkAbstractDatastore
public dkResultSetCursor execute(DKCQExpr cqe) throws DKException, Exception
    Executes a query in the DKCQExpr.
    Parameters:
        qe - a common query expression object
    Returns:
        resultSetCursor which represents a datastore cursor.
    Overrides:
        execute in class dkAbstractDatastore
public void execute WithCallback(dkQuery query,
    dkCallback callbackObj) throws DKException, Exception
    Executes a query with callback function.
    Parameters:
        qo - a query object
        callbackObj - a dkCallback object
    Overrides:
        executeWithCallback in class dkAbstractDatastore
public void execute WithCallback(String command,
    short commandLangType,
    DKNVPair params[ ],
    dkCallback callbackObj) throws DKException, Exception
    Executes a query with callback function.
    Parameters:
        command - a query string
        commandLang - a query type
        params - additional query option in name/value pair
        callbackObj - a dkCallback object
    Overrides:
        executeWithCallback in class dkAbstractDatastore
public void execute WithCallback(DKCQExpr qe,
    dkCallback callbackObj) throws DKException, Exception
    Executes a query with callback function.
    Parameters:
        qe - a common query expression object
        callbackObj - a dkCallback object
    Overrides:
        executeWithCallback in class dkAbstractDatastore
public dkQuery create Query(String command,
    short commandLangType,
    DKNVPairparams[ ]) throws DKException, Exception
    Creates a query object.
    Parameters:
        command - a query string
        commandLang - a query type
        params - additional query option in name/value pair
```

-continued

```
        Returns:
            a query object
        Overrides:
            createQuery in class dkAbstractDatastore
public dkQuery create Query(DKCQExpr qe) throws DKException, Exception
    Creates a query object.
    Parameters:
        qe - a common query expression object
    Overrides:
        createQuery in class dkAbstractDatastore
public void retrieveObject(dkDataObject ddo) throws DKException, Exception
    Retrieves the data-object from this datastore.
    Parameters:
        ddo - the data-object to be retrieved from this datastore
    Overrides:
        retrieveObject in class dkAbstractDatastore
    See Also:
        retrieve
        disconnect
public void disconnect( ) throws DKException, Exception
    Disconnects from a datastore.
    Overrides:
        isconnect in class dkAbstractDatastore
public boolean isConnected( ) throws Exception
    Checks to see if the datastore is connected.
    Returns:
        true if connected
    Overrides:
        isConnected in class dkAbstractDatastore
public String datastoreName( ) throws Exception
    Gets the name of this datastore object. Usually it represents a datastore source's server name.
    Returns:
        datastore name
    Overrides:
        datastoreName in class dkAbstractDatastore
public DKHandle handle(String type) throws Exception
    Gets either the DES session handle or the broker handle based on type.
    Parameters:
        type - of handle - session of broker
    Returns:
        session or broker handle
    Overrides:
        handle in class dkAbstractDatastore
public DKHandle connection( ) throws Exception
    Gets the connection handle for a datastore.
    Returns:
        session handle
    Overrides:
        connection in class dkAbstractDatastore
public String datastoreType( ) throws Exception
    Gets the datastore type for this datastore object.
    Returns:
        datastore type
    Overrides:
        datastoreType in class dkAbstractDatastore
public String userName( ) throws Exception
    Gets the user name for this datastore object.
    Returns:
        user name
    Overrides:
        userName in class dkAbstractDatastore
public dkCollection listDataSources( ) throws DKException
    Lists the available datastore sources that a user can connect to.
    Returns:
        a collection of server defs
    Throws: DKException
        if internal error occurs from server
    Overrides:
        listDataSources in class dkAbstractDatastore
public String[ ] listDataSourceNames( ) throws DKException
    Gets a list of datasource names.
    Returns:
        an array of datasource names
    Throws: DKException
        if error occurs when retrieving datasource names
    Overrides:
        listDataSourceNames in class dkAbstractDatastore
```

-continued

*public dkCollection listEntities( ) throws DKException, Exception*
    Gets a list of entities from persistent datastore.
    Returns:
        a collection of entity defs
    Throws: DKException
        if error occurs
    Overrides:
        listEntities in class dkAbstractDatastore
*public String[ ] listEntityNames( ) throws DKException, Exception*
    Gets a list of entity names from persistent datastore.
    Returns:
        an array of entity names
    Throws: DKException
        if error occurs
    Overrides:
        listEntityNames in class dkAbstractDatastore
*public dkCollection listEntityAttrs(String entityName) throws DKException, Exception*
    Gets a list of attributes for a given entity name.
    Parameters:
        entityName - name of entity to retrieve attributes for
    Returns:
        a dkCollection of dkAttrDef objects
    Throws: DKException
        if the entity name does not exist
    Overrides:
        listEntityAttrs in class dkAbstractDatastore
*public String[ ] listEntityAttrNames(String entityName) throws DKException, Exception*
    Gets a list of attribute names for a given entity name.
    Parameters:
        entityName - name of entity to retrieve attribute names for
    Returns:
        an array of attribute names
    Throws: DKException
        if the entity name does not exist
    Overrides:
        listEntityAttrNames in class dkAbstractDatastore
*public dkDatastoreDef datastoreDef( )*
    Gets datastore definition.
    Returns:
        the meta-data (dkDatastoreDef) of this datastore
    Overrides:
        datastoreDef in class dkAbstractDatastore
*public String registerMapping(DKNVPair sourceMap) throws DKException, Exception*
    Registers a mapping definition to this datastore. Mapping is done by entities.
    Parameters:
        sourceMap - source name and mapping, a DKNVPair class with the following
        possible values:
        ("BUFFER",): buffer_ref is a reference to a string in memory
        ("FILE",): file_name is the name of the file containing the mapping
        ("URL",): URL-address location of the mapping
        ("LDAP",): LDAP file-name
        ("SCHEMA",): a reference to a dkSchemaMapping object defining the
        mapping. Currently, only "SCHEMA" option is supported, others may be
        added later.
    Returns:
        the name of the mapping definition.
    Overrides:
        registerMapping in class dkAbstractDatastore
    See Also:
        unRegisterMapping
*public void unRegisterMapping(String mappingName) throws DKException, Exception*
    Unregisters mapping information from this datastore.
    Parameters:
        mappingName - name of the mapping information
    Overrides:
        unRegisterMapping in class dkAbstraciDatastore
    See Also:
        registerMapping
*public String[ ] listMappingNames( ) throws DKException, Exception*
    Gets the list of the registered mappings from this datastore.
    Returns:
        an array of registered mapping objects' names
    Overrides:
        listMappingNames in class dkAbstractDatastore
    See Also:
        registerMapping
*public dkSchemaMapping getMapping(String mappingName) throws DKException, Exception*
    Gets mapping information from this datastore.

-continued

```
        Parameters:
            mappingName - name of the mapping information
        Returns:
            the schema mapping object
        Overrides:
            getMapping in class dkAbstractDatastore
        See Also:
            registerMapping
public DKDDO createDDO(String objectType,
    int Flags) throws DKException, Exception
        Creates a new DDO with a basic pid for DES.
        Parameters:
            objectType - the object type you want to create
            Flags - not used for DES
        Returns:
            a new DDO of the given object type
        Overrides:
            createDDO in class dkAbstractDatastore
public synchronized dkExtension getExtension(String extensionName) throws DKException,
Exception
        Gets the extension object from a given extension name.
        Parameters:
            extensionName - name of the extension object.
        Returns:
            extension object.
        Overrides:
            getExtension in class dkAbstractDatastore
public synchronized void addExtension(String extensionName,
    dkExtension extensionObj) throws DKException, Exception
        Adds a new extension object.
        Parameters:
            extensionName - name of new extension object
            extensionObj - the extension object to be set
        Overrides:
            addExtension in class dkAbstractDatastore
public synchronized void removeExtension(String extensionName) throws DKException, Exception
        Removes an existing extension object.
        Parameters:
            extensionName - name of extension object to be removed
        Overrides:
            removeExtension in class dkAbstractDatastore
public synchronized String[ ] listExtensionNames( ) throws DKException, Exception
        Gets the list of extension objectst names.
        Returns:
            an array of extension objects' names
        Overrides:
            listExtensionNames in class dkAbstractDatastore
public DKCQExpr translate(DKCQExpr cqe) throws DKException, Exception
        Translates a query expression into a native query expression processable by
this datastore.
        Parameters:
            cqe - the input compound query expression
        Returns:
            a translated query expression or null if the expression is invalid
public void addObject(dkDataObject ddo) throws DKException, Exception
        Adds object.
        Overrides:
            addObject in class dkAbstractDatastore
public void deleteObject(dkDataObject ddo) throws DKException, Exception
        Deletes object.
        Overrides:
            deleteObject in class dkAbstractDatastore
public void updateObject(dkDataObject ddo) throws DKException, Exception
        Updates object.
        Overrides:
            updateObject in class dkAbstractDatastore
public void commit( ) throws DKException, Exception
        Commits.
        Overrides:
            commit in class dkAbstractDatastore
public void rollback( ) throws DKException, Exception
        Rolls back.
        Overrides:
            rollback in class dkAbstractDatastore
public Object listSchema( ) throws DKException, Exception
        Lists schemas.
        Overrides:
            listSchema in class dkAbstractDatastore
```

-continued

*public Object listSchemaAttributes(String schemaEntry) throws DKException, Exception*
    Lists schema attributes.
    Overrides:
        listSchemaAttributes in class dkAbstractDatastore
*public void destroy( ) throws DKException, Exception*
    datastore destroy - datastore cleanup if needed
    Destroys.
    Overrides:
        destroy in class dkAbstractDatastore
    An example class definition for a DES query (DKDESQuery.java) is set forth below.

*DKDESQuery.java*

```
package com.ibm.mm.sdk.common.DKDESQuery
public class DKDESQuery extends Object
    implements dkQuery, DKConstantDES, DKMessageId, Serializable
{
public DKDESQuery(dkDatastore creator,
    String queryString)
public DKDESQuery(dkDatastore creator,
    DKCQExpr queryExpr)
public DKDESQuery(DKDESQuery fromQuery)
public void prepare(DKNVPair params[ ]) throws DKException, Exception
public void execute(DKNVPair params[ ]) throws DKException, Exception
public int status( )
public Object result( ) throws DKException, Exception
public dkResultSetCursor resultSetCursor( ) throws DKException, Exception
public short qlType( )
public String queryString( )
public dkDatastore getDatastore( )
public void setDatastore(dkDatastore ds) throws DKiException, Exception
public String getName( )
public void setName(String name)
public int numberOfResults( )
}
```

The following methods are part of the DES query class:
public DKDESQuery(dkDatastore creator, String queryString)
    Constructs a parametric GQL query.
    Parameters:
        creator—datastore
        queryString—a query string
public DKDESQuery(dkDatastore creator, DKCQExpr queryExpr)
    Constructs a parametric query.
    Parameters:
        creator—datastore
        queryExpr—a query expression
public DKDESQuery(DKDESQueryfromQuery)
    Constructs a parametric query from a parametric query object.
    Parameters:
        fromQuery—parametric query
public void prepare(DKNVPair params[]) throws DKException, Exception
    Prepares the query.
    Parameters:
        params—additional prepare query option in name/value pair
public void execute(DKNVPair params[]) throws DKException, Exception
    Executes the query.
    Parameters:
        params—additional query option in name/value pair
public int status( )
    Gets query status.
    Returns:
        query status
public Object result( ) throws DKException, Exception
    Gets query result.
    Returns:
        query result in a DKResults object.
public dkResultSetCursor resultSetCursor( ) throws DKException, Exception
    Gets query result.
    Returns:
        query result in a dkResultSetCursor object
public short qlType( )
    Gets query type.
    Returns:
        query type
public String queryString( )
    Get query string.
    Returns:
        query string
public dkDatastore getDatastore( )
    Gets the reference to the owner datastore object.
    Returns:
        the dkdatastore object
public void setDatastore(dkDatastore ds) throws DKException, Exception
    Sets the reference to the owner datastore object.
    Parameters:
        ds—a datastore
public String getName( )
    Gets query name.
    Returns:
        name of this query
public void setName(String name)
    Sets query name.

Parameters:
name—new name to be set to this query object
public int numberOfResults( )
Gets the number of query results.
Returns:
number of query results A search gateway query is used to access a search gateway data source. One example of a search gateway query is a DES query string. The following is sample syntax of a DES query string. However, it is to be understood that other syntax (including other parameters) may be used for the DES query string without departing from the scope of the invention.

```
SEARCH= (DATABASE= (db_name |db_name_list |ALL);
COND= (GQL expression));
[OPTION= ((SEARCHABLE_FIELD= (fd_name, . . .) ;]
[RETRIEVALBE_FIELD= (fd_name, . . .) ;]
[MAX_RESULTS=maximum_results;]
[TIME_LIMIT=time] )]
```

The parameter db_name_list is a list of database names (i.e., db_name) separated by commas. The term ALL indicates that all of the available databases are to be searched. In one embodiment, the default time limit for a search is 30 seconds.

GQL or Generalized Query Language is the native query language for expressing queries against DES.

An example of a GQL expression for searching documents which have their "view" field containing the exact string "How Do I?" is as follows:

(EQ "view" "How Do I?")

A sample program illustrating a direct search to a DES datastore is as follows:

Java Sample—DES Datastore

```
DKDatastoreDES dsDES = new DKDatastoreDES( );
dkdResultsctCursor pCur = null;
DKNVPair parms[] = null;
dsDES.connect(libSrv,userid,pw,connect_string);
String cmd = "SEARCH=(DATABASE=(Notes Help);"+
"COND=(EQ\"View\"\"How Do I?\"));"
"OPTION=(MAX_RESULTS=5)":
DKDDO ddo = null;
pCur = dsDES.execute(cmd,DK_DES_GQL_QL_TYPE,parms);
. . .
pCur.destroy( ); // Finished with the cursor
dsDES.disconnect( );
```

The query results are returned in the form of a result set cursor for DES. This result set cursor for DES is a subclass of dkResultSetCursor, which is the superclass of other result set cursors. The implementation of result set cursor for DES can be similar to the federated result set cursor, in which the results are grouped by each back-end source, i.e., Lotus Notes, Web Search, etc., or when such a grouping is not required, the results can be lumped together without distinguishing the source.

Thus, the federated datastore, each terminal data repository, and the DES datastore are data objects based on classes that are based on a single base class. Once the federated datastore, each terminal data repository, and the DES datastore are instantiated as data objects, they interact with each other via methods of the classes. Additionally, once the federated datastore receives a query in the syntax of the federated datastore query, the federated datastore may submit a query to the DES datastore in the federated query canonical form.

The format of the results from DES depends on the type of the back-end data repository searched. The following examples illustrate a direct query and the resulting data format returned from Lotus Notes database, file system, relational database, and web search, respectively.

EXAMPLE 1

Direct Query and Search Results from Lotus Notes Database

```
query string : SEARCH=(DATABASE=(Notes Help);
    COND= ((AND (GT "Doc_Number""2.0"(EQ "Indent" "2.0"))));
    OPTION= (MAX_RESULTS=2; TIIME_LIMIT=10);
``` attribute name: DocRank value: 85
attribute name: DocLNUiversalID value: 006BE1F29E612FOC852564D2000FD785
attribute name: DocNotesWebHostName value: ross.stl.ibm.com
attribute name: DocNotesWebViewName value: FIND
attribute name: DocLNServer value: ross.stl.ibm.com/Stl
attribute name: DocLNPath value: help4.nsf
attribute name: DocLinkType value: Notes
attribute name: Subject value: Deleting several columns or rows from a table
attribute name: TopicType value: Steps
attribute name: View value: How Do I?
attribute name: Indent value: 2
attribute name: Doc_Number value: 4.265

EXAMPLE 2

Direct Query and Search Results from File System query string: SEARCH=(DATABASE=(DES files); COND=((IN "DocSFileName" "a")));
attribute name: DocRank value: 100
attribute name: DocLinkType value: FileSearch
attribute name: DocFile name value: starwars.lwp
attribute name: DocPath value: d:\desdoc\
attribute name: DocDate value: Jun. 25, 1999 0:0:0
attribute name: DocSize value: 977676
attribute name: DocScontent value:
XDO pid database name DES files
XDO pid docId d:\desdoc\starwars.lwp
XDO mimetype text/html
attribute name: DocSFileName value: starwars.lwp

EXAMPLE 3

Direct Query and Search Results from Relational Database query string: SEARCH=(DATABASE=(EMPLOYEE: ;COND=((IN "Job" "Manager")));
OPTION=(MAX_RESULTS=2; TIME_LIMIT=10);
attribute name: DocRank value: 55
attribute name: DocLinkType value: NotesPumpSQL
attribute name: EMPNO value: 000030 attribute name: FIRSTNME VALUE: SALLY
attribute name: MIDINIT value: A
attribute name: LASTNAME value: KWAN
attribute name: WORKDEPT value: C01
attribute name: PHONENO value: 4738
attribute name: HIREDATE value: Apr. 5, 1975 0:0:0
attribute name: JOB value: MANAGER
attribute name: EDLEVEL value: 20
attribute name: SEX value: F
attribute name: BIRTHDATE value: May 11, 1941 0:0:0

EXAMPLE 4

Figure 7:
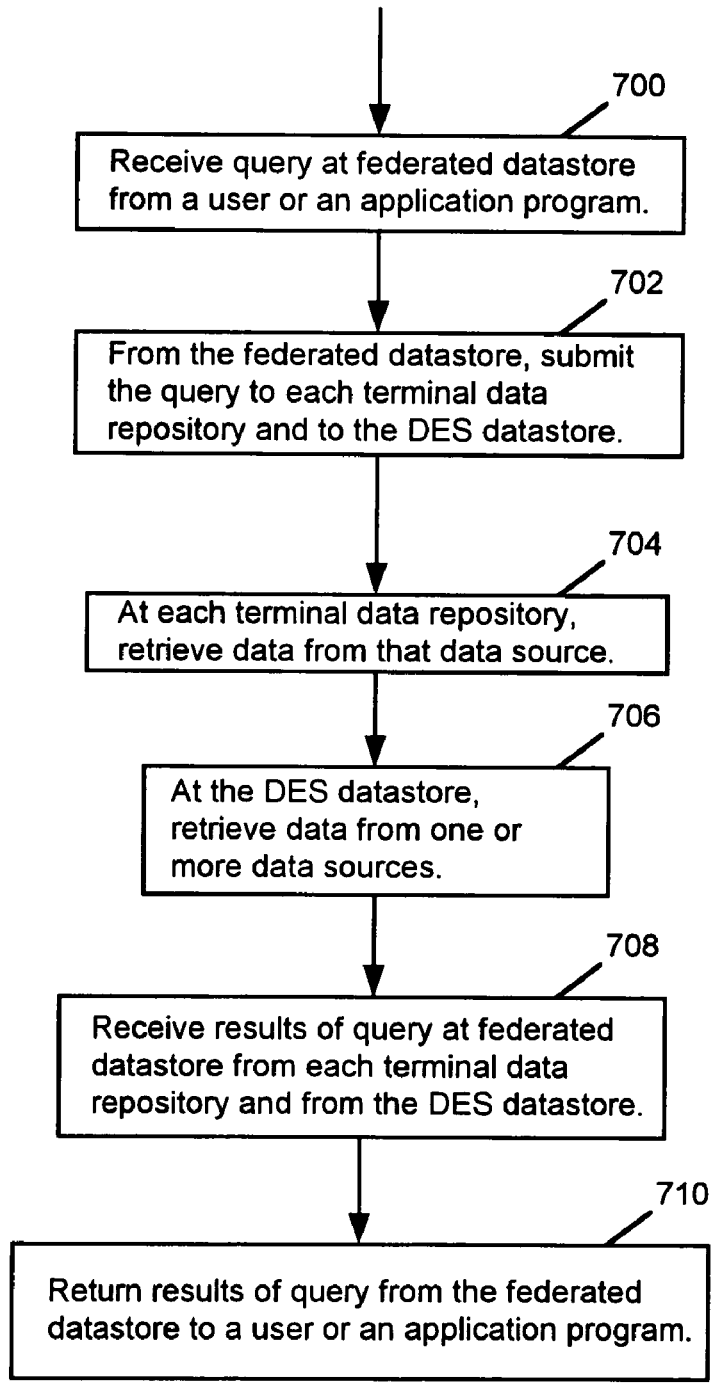
FIG. 7 is a flow diagram illustrating one use of the search gateway architecture.

Direct Query and Search Results from Web Search query string: SEARCH=(DATABASE=(HotBot—Web);
   COND=((AND "clinton" "internet"));
   OPTION=(MAX_RESULTS=2; TIME_LIMIT=30))
attribute name: DocRank value: 99
attribute name: DocLinkType value: WebSearchEngine
attribute name: WebTitle value: Clinton says 'No' to Internet Taxes
attribute name: WebURL value:
   http://www.hotbot.com/
      director.asp?target=http%3A%2F
      %2Fwww%2Eobserverations$2Eorg%2Farticles%2FA
      %5Fnotaxonet%2Ehtml&id=2&userid=3gFNDe5t0
      HA7&query=MT=%28clinton+AND+internet+
      %29&SM=B&LG=english&DC=100%rsource=Ink
attribute name: WebDescription value:
   Article describing Clinton's decision on Internet Taxes FIG. 7 is a flow diagram illustrating one use of a search gateway architecture. In block 700, the federated datastore receives a query from a user or an application program. In block 702, the federated datastore submits the query to each terminal data repository and to the DES datastore. In block 704, each terminal data repository retrieves data from that data source. In block 706, the DES datastore retrieves data from one or more data sources (e.g., the Web or a file system). The result is a union of results from DES back-end datastores. It can be grouped by each back-end or ungrouped. In block 708, the federated datastore receives the results of a query from each terminal data repository and from the DES datastore. In block 710, the federated datastore returns the results of the query to a user or an application program.

The integration of a federated datastore with an extended search system unifies and enriches the client/middle server environments for consolidated and Web-enabled access across combined federation targets of distributed and heterogeneous datastores. In addition to browsers or Java clients accessing the federated datastore, other applications, such as a Notes client, may be used to access the federated datastore. Content management multimedia content servers provide additional capabilities to the Notes client. The integration of a federated datastore and an extended search system combines the power and benefits of both.

The integration of a federated datastore with an extended search system adds a native Notes client development environment over the federated search mechanisms. Additional federation targets (e.g., for Notes, Web search engines, file systems, RDB/ODBC) are added to the federated datastore. Also, additional federation targets (e.g., VisualInfo/Digital Library, OnDemand, and ImagePlus; and, multimedia servers such as TextMiner, QBIC, and DB2 VideoCharger) are added to the Notes application. The integration harmonizes client/middle server environments of the federated datastore and the Notes client application with a common object oriented model and application programming interface and common system administration.

Conclusions

This concludes the description of the preferred embodiment of the invention. The following describes some alternative embodiments for accomplishing the present invention. For example, any type of computer, such as a mainframe, minicomputer, personal computer, mobile device, or embedded system, or computer configuration, such as a timesharing mainframe, local area network, or standalone personal computer, could be used with the techniques of the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of searching for data in heterogeneous data sources with a computer system, the method comprising:
   receiving a reciuest for data at a given federated data source; and
   from the given federated data source, retrieving data from a plurality of datastores, including:
      data from one or more terminal data repositories,
      data, with a schema conceptual view of the data, from one or more other federated data sources, and
      data, without a schema conceptual view of the data, from one or more search gateway data sources;
   the given federated data source providing a unified schema conceptual view of: (a) the data from the plurality of datastores, (b) the data from the terminal data repositories, and (c) the data and schema conceptual view from the other federated data sources,
   wherein said one or more search gateway data sources is a Domino Extended Search (DES).

2. An apparatus for searching for data in one or more heterogeneous data sources, comprising:
   a computer system accessing said one or more heterogeneous data sources; and
   one or more computer programs, performed by the computer system, for:
      receiving a reciuest for data at a given federated data source; and
      from the given federated data source, retrieving data from a plurality of datastores, including:
         data from one or more terminal data repositories,
         data, with a schema conceptual view of the data, from one or more other federated data sources, and
         data, without a schema conceptual view of the data, from one or more search gateway data sources;
      the given federated data source providing a unified schema conceptual view of: (a) the data from the plurality of datastores, (b) the data from the terminal data repositories, and (c) the data and schema conceptual view from the other federated data sources,
      wherein said one or more search gateway data sources is a Domino Extended Search (DES).

3. An article of manufacture comprising a program storage medium readable by a computer and embodying one or more instructions executable by the computer to perform method steps for searching for data in one or more heterogeneous data sources within a computer system, the method comprising:

receiving a request for data at a given federated data source; and from the given federated data source, retrieving data from a plurality of datastores, including:

data from one or more terminal data repositories, data, with a schema conceptual view of the data, from one or more other federated data sources, and data, without a schema conceptual view of the data, from one or more search gateway data sources;

the given federated data source providing a unified schema conceptual view of: (a) the data from the plurality of datastores, (b) the data from the terminal data repositories, and (c) the data and schema conceptual view from the other federated data sources, wherein said one or more search gateway data sources is a Domino Extended Search (DES).

\* \* \* \* \*

UNITED STATES PATENT AND TRADEMARK OFFICE
CERTIFICATE OF CORRECTION

| | | |
|---|---|---|
| PATENT NO. | : 7,113,939 B2 | Page 1 of 1 |
| APPLICATION NO. | : 09/399682 | |
| DATED | : September 26, 2006 | |
| INVENTOR(S) | : Chou et al. | |

It is certified that error appears in the above-identified patent and that said Letters Patent is hereby corrected as shown below:

On the Title page,

[*] Notice:   Subject to any disclaimer, the term of this patent is extended or adjusted under 35 USC 154(b) by (155) days Delete the phrase "by 155" and insert -- by 297 days--

Signed and Sealed this

First Day of May, 2007

JON W. DUDAS
*Director of the United States Patent and Trademark Office*